United States Patent
Terada et al.

(10) Patent No.: US 10,087,321 B2
(45) Date of Patent: Oct. 2, 2018

(54) FLUORINATED RESIN COMPOSITION

(71) Applicant: ASAHI GLASS COMPANY, LIMITED, Chiyoda-ku (JP)

(72) Inventors: Tatsuya Terada, Chiyoda-ku (JP); Takashi Sato, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 8 days.

(21) Appl. No.: 15/354,605

(22) Filed: Nov. 17, 2016

(65) Prior Publication Data

US 2017/0066915 A1    Mar. 9, 2017

Related U.S. Application Data

(63) Continuation of application No. PCT/JP2015/068401, filed on Jun. 25, 2015.

(30) Foreign Application Priority Data

Jun. 27, 2014 (JP) .................................. 2014-132570

(51) Int. Cl.
C08L 27/18 (2006.01)

(52) U.S. Cl.
CPC ......... C08L 27/18 (2013.01); *C08L 2205/025* (2013.01)

(58) Field of Classification Search
CPC .......... C08L 27/18; C08L 27/20; C08L 23/08; C08L 35/08; C08L 47/00; C08L 2205/02; C08L 2205/025; C08L 31/06; C08L 33/02; C08L 33/04; C08L 33/24
See application file for complete search history.

(56) References Cited

U.S. PATENT DOCUMENTS

| | | |
|---|---|---|
| 2003/0162923 A1 | 8/2003 | Funaki et al. |
| 2004/0116606 A1 | 6/2004 | Sumi et al. |
| 2004/0142134 A1 | 7/2004 | Funaki et al. |
| 2004/0210017 A1* | 10/2004 | Rajagopalan ........... C08L 27/16 526/242 |
| 2009/0022922 A1* | 1/2009 | Park ...................... C08F 214/18 428/36.9 |
| 2010/0204423 A1 | 8/2010 | Fukunaga et al. |
| 2010/0286352 A1 | 11/2010 | Fukunaga et al. |

FOREIGN PATENT DOCUMENTS

| | | |
|---|---|---|
| JP | 2004-238405 | 8/2004 |
| JP | 2012-21054 | 2/2012 |
| JP | 2015-4057 | 1/2015 |
| WO | WO 2006/134764 A1 | 12/2006 |
| WO | WO 2009/096547 A1 | 8/2009 |
| WO | WO 2014/189016 A1 | 11/2014 |

OTHER PUBLICATIONS

International Search Report dated Sep. 15, 2015 in PCT/JP2015/068401, filed on Jun. 25, 2015.
Satoru Imai et al., "Chosa Bunki o Donyu shita ETFE no Ichijiku Shincho Nendo Tokusei(Properties of uniaxial elongational viscosity of ETFE with long-chain branches)", Journal of the Japan Society of Polymer Processing, 2010, 21, pp. 2.
Satoru Imai et al., "ETFE no Chosa Bunki ga Yoyu Nendo Tokusei ni Oyobosu Eikyo ni Kanshite(Effect of long-chain branch introduced ETFE on Melt Viscosity Properties)", Polymer Processing Symposia, 2011, pp. 4 ( with English Abstract).
Takashi Kato et al., "Rheological measurements of LCB-ETFE and application to foaming", Polymer Processing Symposia, 2012, pp. 4.
Takashi Kato et al., "Rheological behavior and foamed cell size of ETFE with copolymerized divinyl monomer", Rheology Toronkai Koen Yoshishu, 61, 2013, pp. 2.
Takashi Kato et al., "Melt rheological behavior and batch foaming of modified ETFE", Polymer Processing Symposia, 2014, pp. 4 ( with English Abstract).

* cited by examiner

*Primary Examiner* — Nathan M Nutter

(74) *Attorney, Agent, or Firm* — Oblon, McClelland, Maier & Neustadt, L.L.P.

(57) ABSTRACT

A fluorinated resin composition includes a copolymer (A); and a copolymer (B). A mass ratio (A/B) of the copolymer (A) to the copolymer (B) is from 60/40 to 99/1, and a volume flow rate is from 0.5 to 100 mm$^3$/sec. The copolymer (A) comprises: units derived from a monomer (a) which is tetrafluoroethylene; units derived from a monomer (b) which is at least one member selected from ethylene, hexafluoropropylene and a perfluoro(alkyl vinyl ether). The copolymer (A) has carbonyl groups. The copolymer (B) comprises: units derived from the monomer (a); units derived from the monomer (b); and units derived from the monomer (c) having two or more polymerizable carbon-carbon double bonds. A content of the units derived from the monomer (c) is from 0.1 to 2 mol % based on total units in the copolymer (B).

27 Claims, No Drawings

FLUORINATED RESIN COMPOSITION

This application is a continuation of PCT Application No. PCT/JP2015/068401, filed on Jun. 25, 2015, which is based upon and claims the benefit of priority from Japanese Patent Application No. 2014-132570 filed on Jun. 27, 2014. The contents of those applications are incorporated herein by reference in their entireties.

TECHNICAL FIELD

The present invention relates to a fluorinated resin composition.

BACKGROUND ART

A fluororesin such as polytetrafluoroethylene, a tetrafluoroethylene/perfluoro(alkyl vinyl ether) copolymer or an ethylene/tetrafluroethylene copolymer, has excellent characteristics in heat resistance, chemical resistance, water resistance, oil resistance, weather resistance, aging resistance, gas barrier properties, fuel barrier properties, releasing properties, non-stickiness, stain resistance, colorant adhesion resistance, non-elution properties, etc. Therefore, the fluororesin is used in various fields such as the semiconductor industry, aircraft and automotive industry, food manufacturing industry, medical industry, etc.

In the above applications, in order to make up for deficiency in mechanical properties such as wear resistance, toughness, flexibility, etc. or in order to reduce costs, such an attempt has been made that a fluororesin is made to be a laminate with another general-purpose resin material, etc.

However, a fluororesin is generally poor in adhesion to another material, and if it is laminated with another resin material as it is, it is difficult to obtain a strong interlayer adhesion. Further, a fluororesin generally has a high molding temperature as compared with other resin materials, whereby there is a problem such that many other resin materials cannot withstand the molding condition of the fluororesin.

In order to solve such problems, Patent Document 1 proposes a multilayer laminate containing a laminate. The laminate includes a layer made of a fluororesin having functional groups such as acid anhydride groups (—CO—O—CO—) and having a melting point of from 120 to 230° C., and a layer made of a thermoplastic resin having functional groups capable of reacting with the functional groups of the fluororesin to form chemical bonds, which are directly bonded.

The fluororesin disclosed in Patent Document 1 has functional groups such as acid anhydride groups, whereby its adhesion to another material is improved. In addition to this, the thermoplastic resin has specific functional groups, so that the adhesive functional groups and the functional groups of the thermoplastic resin will be reacted to form chemical bonds at the time of lamination, whereby the interlayer adhesion is said to be further enhanced. Further, this fluororesin has a low melting point and therefore can be molded at a molding temperature at which the thermoplastic resin can withstand.

However, this fluororesin is insufficient in elongation deformation processability and thus has a problem when subjected to mold processing accompanying elongation deformation (such as blow molding, inflation molding, foam molding or film forming). The problem includes unevenness in thickness or wrinkles due to thinning, or non-uniformity of bubble diameters.

PRIOR ART DOCUMENT

Patent Document

Patent Document 1: WO2006/134764

DISCLOSURE OF INVENTION

Technical Problem

It is an object of the present invention to provide a fluorinated resin composition excellent in adhesion and elongation deformation processability.

Solution to Problem

The present invention has the following aspects.

[1] A fluorinated resin composition characterized by comprising the following copolymer (A) and the following copolymer (B), wherein the mass ratio (A/B) of the following copolymer (A) to the following copolymer (B) is from 60/40 to 99/1, and the following volume flow rate is from 0.5 to 100 mm$^3$/sec.:

Copolymer (A): a copolymer comprising units derived from the following monomer (a) and units derived from the following monomer (b), and optionally containing units derived from the following monomer (c), wherein the content of the units derived from the following monomer (c) is from 0 to 0.05 mol % based on the total of all units, and it has carbonyl groups, Copolymer (B): a copolymer comprising units derived from the following monomer (a), units derived from the following monomer (b) and units derived from the following monomer (c), wherein the content of the units derived from the following monomer (c) is from 0.1 to 2 mol % based on the total of all units, Volume flow rate: extrusion rate (mm$^3$/sec.) at the time of extruding the fluorinated resin composition from an orifice having a diameter of 2.1 mm and a length of 8 mm under a pressure of 68.7N/cm$^2$ at a temperature of the melting point+50° C., Monomer (a): tetrafluoroethylene, Monomer (b): at least one member selected from ethylene, hexafluoropropylene and a perfluoro(alkyl vinyl ether), Monomer (c): a monomer having two or more polymerizable carbon-carbon double bonds.

[2] The fluorinated resin composition according to [1], wherein the copolymer (A) further contains units derived from the following monomer (d):

Monomer (d): a monomer having a carbonyl group and one polymerizable carbon-carbon double bond.

[3] The fluorinated resin composition according to [2], wherein the monomer (d) is an acid anhydride of an unsaturated dicarboxylic acid.

[4] The fluorinated resin composition according to any one of [1] to [3], wherein the following content of carbonyl groups in the total of the copolymer (A) and the copolymer (B) is from 1,400 to 5,000:

Content of carbonyl groups: the number of carbonyl groups per 1×10 carbon atoms as the number of carbon atoms in the molecular chain composed of repeating units in the total of the copolymer (A) and the copolymer (B) as determined by an IR absorption spectrum analysis using a Fourier transform infrared spectrometer.

[5] The fluorinated resin composition according to any one of [1] to [4], wherein the ratio (X/W) of the melt tension X (N) to the load W (N) at the time of measuring the melt tension X is from $0.35 \times 10^{-4}$ to $2.0 \times 10^{-4}$ [N/N].

[6] The fluorinated resin composition according to any one of [1] to [5], wherein the monomer (c) is represented by the following formula (c1):

(c1)

wherein $R^f$ is a fluoroalkylene group, and $Y^1$ and $Z^1$ are each independently a vinyl group, a trifluorovinyl group or a trifluorovinyloxy group.

[7] The fluorinated resin composition according to [6], wherein $R^f$ is a perfluoroalkylene group having from 4 to 8 carbon atoms.

[8] The fluorinated resin composition according to any one of [1] to [7], wherein the units derived from the monomer (b) in the copolymer (A) and the units derived from the monomer (b) in the copolymer (B) are both units derived from ethylene.

[9] The fluorinated resin composition according to [8], wherein the molar ratio ([units derived from monomer (a)]/[units derived from monomer (b)]) of the units derived from the monomer (a) to the units derived from the monomer (b) in each of the copolymer (A) and the copolymer (B) is from 30/70 to 70/30.

[10] The fluorinated resin composition according to [8] or [9], wherein each of the copolymer (A) and the copolymer (B) further has units derived from hexafluoropropylene, wherein the content of the units derived from hexafluoropropylene is from 4 to 19 mol % based on the total of all units.

[11] The fluorinated resin composition according to any one of [1] to [7], wherein the units derived from the monomer (b) in the copolymer (A) and the units derived from the monomer (b) in the copolymer (B), are both units derived from hexafluoropropylene.

[12] The fluorinated resin composition according to [11], wherein the molar ratio ([units derived from monomer (a)]/[units derived from monomer (b)]) of the units derived from the monomer (a) to the units derived from the monomer (b) in each of the copolymer (A) and the copolymer (B) is from 60/40 to 97/3.

[13] The fluorinated resin composition according to any one of [1] to [7], wherein the units derived from the monomer (b) in the copolymer (A) and the units derived from the monomer (b) in the copolymer (B) are both units derived from a perfluoro(alkyl vinyl ether).

[14] The fluorinated resin composition according to [13], wherein the molar ratio ([units derived from monomer (a)]/[units derived from monomer (b)]) of the units derived from the monomer (a) to the units derived from the monomer (b) in each of the copolymer (A) and the copolymer (B) is from 70/30 to 99/1.

[15] The fluorinated resin composition according to any one of [1] to [14], wherein the melting point of the copolymer (A) is from 120 to 230° C.

Advantageous Effects of Invention

According to the present invention, it is possible to provide a fluorinated resin composition excellent in adhesion and elongation deformation processability.

DESCRIPTION OF EMBODIMENTS

The following definitions of terms apply throughout this specification including claims.

A "monomer" is a compound having a polymerizable carbon-carbon double bond.

The term "units derived from a monomer" is meant for structural units composed of monomer molecules, and formed by polymerization of monomers. A part of monomer molecules may be lost due to decomposition.

A "branched structure" means a structure wherein a molecular chain consisting of repeating units is branched on the way. A pendant group which is a part of a monomer constituting the repeating units is not included in the branch structure.

A "non-fluorinated thermoplastic resin" means a thermoplastic resin containing no fluorine atom.

A volume flow rate (hereinafter referred to also as "Q value") means an extrusion rate ($mm^3$/sec.) at the time of extruding the sample (the fluorinated resin composition, the copolymer (A) or the copolymer (B)) from an orifice having a diameter of 2.1 mm and a length of 8 mm under a pressure of $68.7 N/cm^2$ at a temperature of the melting point+50° C.

The content of carbonyl groups means the number of carbonyl groups per $1 \times 10^6$ carbon atoms as the number of carbon atoms in the molecular chain composed of repeating units in the sample (the sum of the copolymers (A) and (B); the copolymer (A); or the copolymer (B)), which is determined by an infrared absorption spectrum analysis using a Fourier transform infrared spectrometer.

The MIT flex number is a value measured in accordance with ASTM D-2176.

The fluorinated resin composition of the present invention (hereinafter referred to also as "composition (X)") comprises the following copolymer (A) and the following copolymer (B).

The copolymer (A) to be contained in composition (X), may be one type alone, or two or more types in combination.

The copolymer (B) to be contained in composition (X), may be one type alone, or two or more types in combination.

Composition (X) may be composed solely of the copolymer (A) and the copolymer (B), or may further contain components (other resin components or additive components) other than the copolymer (A) and the copolymer (B).

(Copolymer (A))

The copolymer (A) has carbonyl groups. As the copolymer (A) has carbonyl groups, the composition (X) is capable of exhibiting excellent adhesion to a material other than a fluorine resin, for example, to a non-fluorinated thermoplastic resin, etc.

Carbonyl groups may be contained in terminal groups of the main chain of the copolymer (A) or may be contained in pendant groups, or they may be contained in both of them.

In the copolymer (A), a carbonyl group may be present as it is in the carbon chain, or may be present as a group in combination of a carbonyl group and another group or atom (hereinafter referred to also as a "carbonyl group-containing group") in the carbon chain or in terminals of the carbon chain.

Another group means a group other than a carbonyl group or a hydrocarbon group.

The carbonyl group-containing group may, for example, be an acid anhydride group, a carbonate group, a carboxy group, a haloformyl group, an alkoxycarbonyl group, etc.

The haloformyl group may be represented by —C(=O)—X (wherein X is a halogen atom). As the halogen atom in the haloformyl group, a fluorine atom, a chlorine atom, a bromine atom, etc. may be mentioned, and a fluorine atom is preferred. That is, as the haloformyl group, a fluoroformyl group (hereinafter referred to also as a "carbonyl fluoride group") is preferred.

An alkoxy group in the alkoxycarbonyl group may be linear or branched, and is preferably an alkoxy group having from 1 to 8 carbon atoms, particularly preferably a methoxy group or an ethoxy group.

The carbonyl group-containing group to be contained in the copolymer (A) may be one type alone, or two or more types in combination.

In the copolymer (A), the content of carbonyl groups (the number of carbonyl groups per $1 \times 10^6$ carbon atoms as the number of carbon atoms in the molecular chain composed of repeating units) is preferably from $3 \times 10^2$ to $5 \times 10^4$, more preferably from $5 \times 10^2$ to $4 \times 10^4$, particularly preferably from $1 \times 10^3$ to $3 \times 10^4$. When the content of carbonyl groups is in the above range, adhesion to another material such as to a non-fluorinated thermoplastic resin will be excellent.

In the measurement of the content of carbonyl groups, by using a film obtained by molding the copolymer (A), an infrared absorption spectrum analysis is conducted by using a Fourier transform infrared spectrometer, to measure the absorption peak of C=O stretching vibration derived from carbonyl groups, and the content of the carbonyl groups is calculated from the measured value.

The position where the absorption peak of C=O stretching vibration appears, varies depending upon in what state a carbonyl group is present in the copolymer (A) (present as it is in the carbon chain or present as a carbonyl group-containing group in the carbon chain or terminals of the carbon chain, etc.). Therefore, the condition for calculating the content of carbonyl groups is set according to the state of a carbonyl group in the copolymer (A).

Hereinafter, the calculation method for the content of carbonyl groups will be described in detail with respect to each of the case where carbonyl groups are derived from an acid anhydride group, the case where they are derived from a carbonate group, and the case where they are derived from a carbonyl fluoride group.

In a case where two or more types of carbonyl group-containing groups are present, the content of carbonyl groups shall be the total amount of carbonyl groups derived from the respective carbonyl group-containing groups.

Case where carbonyl groups are derived from an acid anhydride group:

A copolymer (A) is press-molded at the melting point+50° C., to prepare a film having a thickness of from 1.5 to 2.0 mm. The obtained film is subjected to an infrared absorption spectrum analysis using a Fourier transform infrared spectrometer, to measure the intensity of the absorption attributable to carbonyl groups appearing in the vicinity of 1,870 cm$^{-1}$. The absorbance of an acid anhydride group is measured by using a molar absorbance coefficient of an acid anhydride group obtained from a model compound (maleic anhydride: 111 L·mol$^{-1}$·cm$^{-1}$, itaconic anhydride: 237 L·mol$^{-1}$·cm$^{-1}$). By the following formula (1), the number (N) of acid anhydride groups per $1 \times 10^6$ carbon atoms as the number of carbon atoms in the molecular chain composed of repeating units is calculated. Twice the value of calculated N is the content (the number) of carbonyl groups.

$$N = 500AW/\varepsilon df \quad \text{Formula (1)}$$

A: absorbance of carbonyl group peak.
ε: molar absorbance coefficient of carbonyl groups [L·mol$^{-1}$·cm$^{-1}$].
W: composition average molecular weight calculated from monomer composition.
d: density of the film [g/cm$^3$].
f: thickness of the film [mm].

Here, the infrared absorption spectrum analysis shall be carried out by scanning 64 times, and the thickness of the film shall be measured by a micrometer. The same applies hereinafter.

Case where carbonyl groups are derived from a carbonate group:

A white powder of a copolymer (A) is compression-molded at room temperature to prepare a film having a thickness of from 1.5 to 2.0 mm. The obtained film is subjected to an infrared absorption spectrum analysis using a Fourier transform infrared spectrometer, to measure the intensity of absorption attributable to carbonyl groups appearing in the vicinity of 1,809 cm$^{-1}$. The absorbance of a carbonate group is measured by using a molar absorbance coefficient (170 L·mol$^{-1}$·cm$^{-1}$) of a carbonate group obtained from a model compound. By the above formula (1), the number (N) of carbonate groups per $1 \times 10^6$ carbon atoms as the number of carbon atoms in the molecular chain composed of repeating units is calculated. The value of calculated N is the content (the number) of carbonyl groups.

Case where carbonyl groups are derived from a carbonyl fluoride group:

A white powder of a copolymer (A) is compression-molded at room temperature, to prepare a film having a thickness of from 1.5 to 2.0 mm. The obtained film is subjected to an infrared absorption spectrum analysis using a Fourier transform infrared spectrometer, to measure the intensity of the absorption attributable to carbonyl groups appearing in the vicinity of 1,880 cm$^{-1}$. The absorbance of a carbonyl fluoride group is measured by using a molar absorbance coefficient (600 L·mol$^{-1}$·cm$^{-1}$) of a carbonyl fluoride group obtained from a model compound. By the above formula (1), the number (N) of carbonyl fluoride groups per $1 \times 10^6$ carbon atoms as the number of carbon atoms in the molecular chain composed of repeating units is calculated. The value of calculated N is the content (the number) of carbonyl groups.

The copolymer (A) may have, in addition to carbonyl groups, at least one type of functional groups selected from the group consisting of hydroxy groups, epoxy groups, hydrolyzable silyl groups, amido groups, and amino groups.

These functional groups may be contained in terminal groups of the main chain of the copolymer (A) or may be contained in pendant groups, or they may be contained in both of them.

The copolymer (A) comprises units derived from the following monomer (a) (hereinafter referred to also as "units (a)") and units derived from the following monomer (b) (hereinafter referred to also as "units (b)").

The copolymer (A) may further has units derived from the following monomer (c) (hereinafter referred to also as "units (c)").

The copolymer (A) preferably further has units derived from the following monomer (d) (hereinafter referred to also as "units (d)").

The copolymer (A) may further has units derived from the following monomer (e) (hereinafter referred to also as "units (e)"), as the case requires.

Monomer (a):

Monomer (a) is tetrafluoroethylene (hereinafter referred to also as "TFE").

The monomer (a) contributes to improvement in the heat resistance, weather resistance, chemical resistance, gas barrier properties, fuel barrier properties, etc. of the composition (X).

Monomer (b):

Monomer (b) is ethylene (hereinafter referred to also as "E"), hexafluoropropylene (hereinafter referred to also as "HFP") or a perfluoro(alkyl vinyl ether) (hereinafter referred to also as "PFVE").

PFVE may, for example, be a compound represented by the following formula (b1) (hereinafter referred to also as "monomer (b1)").

$$CF_2\!=\!CFOR^{f4} \qquad (b1)$$

wherein $R^{f4}$ is a $C_{1-10}$ perfluoroalkyl group or a $C_{2-10}$ perfluoroalkyl group containing an oxygen atom between carbon atoms.

Specific examples of the monomer (b1) include $CF_2\!=\!CFO(CF_2)_2F$, $CF_2\!=\!CFO(CF_2)_3F$, $CF_2\!=\!CFO(CF_2)_4F$, $CF_2\!=\!CFO(CF_2)_8F$, etc. As the monomer (b1), $CF_2\!=\!CFO(CF_2)_3F$ (hereinafter referred to also as "PPVE") is particularly preferred.

As the monomer (b), one type may be used alone, or two or more types may be used in combination.

In a case where the copolymer (A) has units derived from E (hereinafter referred to also as "units E") as units (b), i.e. is an E/TFE copolymer (ETFE), the units (b) in the copolymer (A) may be composed solely of units E or may further have units (b) other than units E.

In a case where the copolymer (A) has units derived from HFP (hereinafter referred to also as "units HFP") as units (b), i.e. is a TFE/HFP copolymer (FEP), the units (b) in the copolymer (A) may be composed solely of units HFP, or may further have units (b) other than units HFP.

In a case where the copolymer (A) has units derived from PFVE (hereinafter referred to also as "units PFVE") as units (b), i.e. is a TFE/PFVE copolymer (PFA), the units (b) in the copolymer (A) may be composed solely of units PFVE, or may further have units (b) other than units PFVE.

The copolymer (A) preferably has at least units E as units (b). That is, it is preferably an E/TFE copolymer. By having units E, the melt-flowability, mechanical properties (cracking resistance, abrasion resistance, toughness, flexibility, etc.), etc. of the composition (X), will be good.

In a case where the copolymer (A) is an E/TFE copolymer, the copolymer (A) preferably further has units HFP. By further having units HFP, the melting point of the copolymer (A) will be low.

Monomer (c):

Monomer (c) is a monomer having two or more polymerizable carbon-carbon double bonds.

Units (c) contribute to improvement of elongation deformability of the composition (X).

As the monomer (c), a compound represented by the following formula (c1) is preferred.

$$Y^1\!-\!R^f\!-\!Z^1 \qquad (c1)$$

wherein $R^f$ is a fluoroalkylene group, and $Y^1$ and $Z^1$ are each independently a vinyl group, a trifluorovinyl group or a trifluorovinyloxy group.

$R^f$ is, from the viewpoint of good physical properties of the composition (X), preferably a fluoroalkylene group, more preferably a fluoroalkylene group having from 1 to 8 carbon atoms. As the fluoroalkylene group, a polyfluoroalkylene group is preferred, and a perfluoroalkylene group is particularly preferred.

$R^f$ is, from the viewpoint of good physical properties of the copolymer (A), preferably a perfluoroalkylene group having from 2 to 8 carbon atoms, more preferably a perfluoroalkylene group having from 4 to 8 carbon atoms, and in view of easy availability, particularly preferably a perfluoroalkylene group having 4 or 6 carbon atoms.

$Y^1$ and $Z^1$ are, from the viewpoint of good copolymerizability, each preferably a vinyl group or a trifluorovinyloxy group. $Y^1$ and $Z^1$ are preferably the same from the viewpoint of easy availability.

As the compound represented by the formula (c1), for example, the following ones may be mentioned.

$$CH_2\!=\!CH\!-\!R^{f1}\!-\!CH\!=\!CH_2,$$

$$CF_2\!=\!CF\!-\!R^{f1}\!-\!CH\!=\!CH_2,$$

$$CF_2\!=\!CF\!-\!R^{f1}\!-\!CF\!=\!CF_2,$$

$$CH_2\!=\!CH\!-\!O\!-\!R^{f1}\!-\!CH\!=\!CH_2,$$

$$CF_2\!=\!CF\!-\!O\!-\!R^{f1}\!-\!CH\!=\!CH_2,$$

$$CF_2\!=\!CF\!-\!O\!-\!R^{f1}\!-\!CF\!=\!CF_2,$$

$$CH_2\!=\!CH\!-\!O\!-\!R^{f1}\!-\!O\!-\!CH\!=\!CH_2,$$

$$CH_2\!=\!CH\!-\!O\!-\!R^{f1}\!-\!O\!-\!CF\!=\!CF_2,$$

$$CF_2\!=\!CF\!-\!O\!-\!R^{f1}\!-\!O\!-\!CF\!=\!CF_2.$$

Here, R is a perfluoroalkylene group having from 2 to 8 carbon atoms.

Preferred embodiments of $R^{f1}$ are the same as the preferred embodiments of $R^f$.

As the monomer (c), one type may be used alone, or two or more types may be used in combination.

As the monomer (c), from the viewpoint of easy availability, preferred are the followings.

$$CH_2\!=\!CH\!-\!(CF_2)_{n1}\!-\!CH\!=\!CH_2,$$

$$CF_2\!=\!CF\!-\!O\!-\!(CF_2)_{n1}\!-\!O\!-\!CF\!=\!CF_2.$$

Here, n1 is an integer of from 4 to 8.

As the monomer (c), the following one is particularly preferred. In the following compound, polymerizable carbon-carbon double bonds are vinyl groups, and from the polymerizablity, the probability of being adjacent to units (a) is high, and the probability of being adjacent to units E is low. Thus, the possibility of hydrocarbon chains being arranged, is low, whereby the copolymer (A) becomes thermally stable.

$$CH_2\!=\!CH\!-\!(CF_2)_{n2}\!-\!CH\!=\!CH_2.$$

Here, n2 is 4 or 6.

Monomer (d):

Monomer (d) is a monomer having a carbonyl group and having one polymerizable carbon-carbon double bond.

As the copolymer (A) has units (d), carbonyl groups are introduced into the copolymer (A). Carbonyl groups in the copolymer (A) being derived from the monomer (d) is preferred. This because it is possible to adjust the introduction amount of carbonyl groups at any proportion regardless of the molecular weight of the copolymer, thereby the adhesive strength can be arbitrarily adjusted.

The monomer (d) may, for example, be a monomer having an acid anhydride group and a polymerizable carbon-carbon double bond (hereinafter referred to also as "monomer (d1)"), a monomer having a carboxy group and a polymerizable carbon-carbon double bond (hereinafter referred to also as "monomer (d2)"), an ester of a carboxylic acid having no polymerizable carbon-carbon double bond with a hydroxy compound having a polymerizable carbon-carbon double bond, an ester of a carboxylic acid having a polymerizable carbon-carbon double bond with a hydroxy compound having no polymerizable carbon-carbon double bond, $CF_2=CFOR^{f3}CO_2X^1$, etc.

Here, $R^{f3}$ is a $C_{1-10}$ perfluoroalkylene group, or a $C_{2-10}$ perfluoroalkylene group containing an oxygen atom between carbon atoms, and $X^1$ is a hydrogen atom or a $C_{1-3}$ alkyl group.

The monomer (d1) may, for example, be an acid anhydride of an unsaturated dicarboxylic acid, such as itaconic anhydride (hereinafter referred to also as "IAH"), citraconic anhydride (hereinafter referred to also as "CAH"), 5-norbornene-2,3-dicarboxylic acid anhydride (hereinafter referred to also as "NAH"), maleic anhydride, etc.

The monomer (d2) may, for example, be an unsaturated dicarboxylic acid such as itaconic acid, citraconic acid, 5-norbornene-2,3-dicarboxylic acid, maleic acid; etc.; an unsaturated monocarboxylic acid such as acrylic acid, methacrylic acid, etc.

The ester of a carboxylic acid having no polymerizable carbon-carbon double bond with a hydroxy compound having a polymerizable carbon-carbon double bond, may, for example, be a vinyl ester such as vinyl acetate, vinyl chloroacetate, vinyl butanoate, vinyl pivalate, vinyl benzoate, vinyl crotonate, etc.

The ester of a carboxylic acid having a polymerizable carbon-carbon double bond with a hydroxy compound having no polymerizable carbon-carbon double bond, may, for example, be an acrylate or methacrylate, such as a (polyfluoroalkyl) acrylate, a (polyfluoroalkyl) methacrylate, etc.

As the monomer (d), one type may be used alone, or two or more types may be used in combination.

As the monomer (d), the monomer (d1) is preferred from the viewpoint of thermal stability. Among them, at least one member selected from the group consisting of IAH, CAH and NAH is particularly preferred. When at least one member selected from the group consisting of IAH, CAH and NAH, is used, it is possible to easily produce a fluorinated copolymer containing acid anhydride groups without necessity of employing a special polymerization method (see JP-A-11-193312) which is required in the case of using maleic anhydride.

Monomer (e):

The monomer (e) is a monomer other than the monomer (a), the monomer (b), the monomer (c) or the monomer (d).

The number of the polymerizable carbon-carbon double bond which the monomer (e) has, is preferably one.

The monomer (e) may, for example, be a hydrocarbon type olefin (but excluding E), a fluoroolefin having hydrogen atoms on an unsaturated group, a fluoroolefin having no hydrogen atom on an unsaturated group (but excluding TFE and HFP), vinyl ether, etc.

The hydrocarbon type olefin (but excluding E) may, for example, be propylene, butene, etc.

The fluoroolefin having hydrogen atoms on an unsaturated group may, for example, be vinylidene fluoride, vinyl fluoride, trifluoroethylene, a compound represented by the following formula (e1) (hereinafter referred to also as "monomer (e1)"), etc.

$$CH_2=CX^2(CF_2)_{n3}Y^2 \quad (e1)$$

wherein $X^2$ and $Y^2$ are each a hydrogen atom or a fluorine atom, and n3 is an integer of from 2 to 10.

Specific examples of the monomer (e1) include $CH_2=CF(CF_2)_{n3}F$, $CH_2=CF(CF_2)_{n3}H$, $CH_2=CH(CF_2)_{n3}F$, $CH_2=CH(CF_2)_{n3}H$, etc. n3 is as defined above.

The fluoroolefin having no hydrogen atom in an unsaturated group (but excluding TFE and HFP) may, for example, be chlorotrifluoroethylene, etc.

The vinyl ether may, for example, be an alkyl vinyl ether, a (fluoroalkyl) vinyl ether, glycidyl vinyl ether, hydroxybutyl vinyl ether, methyl vinyloxy butyl carbonate, etc.

As the monomer (e), one type may be used alone, or two or more types may be used in combination.

As the monomer (e), the monomer (e1) is preferred. When the copolymer (A) has units derived from monomer (e1) (hereinafter referred to also as "units (e1)"), mechanical properties such as cracking resistance, etc., the productivity of the copolymer (A), etc. will be good.

$X^2$ in the monomer (e1) is, from the viewpoint of easy availability, preferably a hydrogen atom.

$Y^2$ in the monomer (e1) is, from the viewpoint of thermal stability, preferably a fluorine atom.

n3 in the monomer (e1) is, from the viewpoint of the physical properties of the copolymer (A), preferably an integer of from 2 to 10, preferably an integer of from 2 to 6, more preferably an integer of from 2 to 4.

As the monomer (e1), $CH_2=CF(CF_2)_{n4}F$, $CH_2=CF(CF_2)_{n4}H$, $CH_2=CH(CF_2)_{n4}F$, $CH_2=CH(CF_2)_{n4}H$, etc., are preferred. Here, n4 is an integer of from 2 to 10.

As the monomer (e1), $CH_2=CH(CF_2)_{n4}F$ is more preferred, and $CH_2=CH(CF_2)_2F$ or $CH_2=CH(CF_2)_4F$ is particularly preferred.

Specific examples of the copolymer (A) include the followings.

TFE/E/IAH copolymer,
TFE/E/CAH copolymer,
TFE/E/IAH/$CH_2=CH(CF_2)_4F$ copolymer,
TFE/E/CAH/$CH_2=CH(CF_2)_4F$ copolymer,
TFE/E/IAH/$CH_2=CH(CF_2)_6F$ copolymer,
TFE/E/CAH/$CH_2=CH(CF_2)_6F$ copolymer,
TFE/E/IAH/$CH_2=CH(CF_2)_8F$ copolymer,
TFE/E/CAH/$CH_2=CH(CF_2)_8F$ copolymer,
TFE/E/HFP/IAH/$CH_2=CH(CF_2)_4F$ copolymer,
TFE/E/HFP/CAH/$CH_2=CH(CF_2)_4F$ copolymer,
TFE/E/HFP/IAH/$CH_2=CH(CF_2)_6F$ copolymer,
TFE/E/HFP/CAH/$CH_2=CH(CF_2)_6F$ copolymer,
TFE/E/HFP/IAH/$CH_2=CH(CF_2)_8F$ copolymer,
TFE/E/HFP/CAH/$CH_2=CH(CF_2)_8F$ copolymer,
TFE/HFP/IAH copolymer,
TFE/HFP/CAH copolymer,
TFE/HFP/IAH/$CH_2=CH(CF_2)_4F$ copolymer,
TFE/HFP/CAH/$CH_2=CH(CF_2)_4F$ copolymer,
TFE/HFP/IAH/$CH_2=CH(CF_2)_6F$ copolymer,
TFE/HFP/CAH/$CH_2=CH(CF_2)_6F$ copolymer,
TFE/HFP/IAH/$CH_2=CH(CF_2)_8F$ copolymer,
TFE/HFP/CAH $CH_2=CH(CF_2)_8F$ copolymer,
TFE/HFP/IAH/$CH_2=CH(CF_2)_8F$ copolymer,
TFE/HFP/CAH/$CH_2=CH(CF_2)_8F$ copolymer,
TFE/HFP/IAH/$CH_2=CF(CF_2)_4F$ copolymer,
TFE/HFP/CAH/$CH_2=CF(CF_2)_4F$ copolymer,
TFE/HFP/IAH/$CH_2=CF(CF_2)_6F$ copolymer,
TFE/HFP/CAH/$CH_2=CF(CF_2)_6F$ copolymer,
TFE/HFP/IAH/$CH_2=CF(CF_2)_8F$ copolymer,
TFE/HFP/CAH/$CH_2=CF(CF_2)_8F$ copolymer,
TFE/HFP/IAH/$CH_2=CF(CF_2)_8F$ copolymer,
TFE/HFP/CAH/$CH_2=CF(CF_2)_8F$ copolymer,
TFE/HFP/IAH/$CF_2=CFO(CF_2)_4F$ copolymer,
TFE/HFP/CAH/$CF_2=CFO(CF_2)_4F$ copolymer,
TFE/HFP/IAH/$CF_2=CFO(CF_2)_5F$ copolymer,
TFE/HFP/CAH/$CF_2=CFO(CF_2)_5F$ copolymer,
TFE/PPVE/IAH copolymer,
TFE/PPVE/CAH copolymer, TFE/IAH/CF$_2$=CFO(CF$_2$)$_4$F copolymer,
TFE/CAH/CF$_2$=CFO(CF$_2$)$_4$F copolymer,
TFE/IAH/CF$_2$=CFO(CF$_2$)$_5$F copolymer,
TFE/CAH/CF$_2$=CFO(CF$_2$)$_5$F copolymer.

The copolymer (A) is preferably a copolymer having units (a), units (b) and units derived from a monomer (d1) (hereinafter referred to also as "copolymer (A1)").

As units (b), the copolymer (A1) particularly preferably has units E, or units E and units HFP.

The copolymer (A1) preferably further has units (e1).

The copolymer (A1) may have a functional group such as an alkoxycarbonyl group, an alkoxycarbonyloxy group, a hydroxy group, a carboxy group, a carbonyl fluoride group at a terminal of the molecular chain composed of repeating units.

Composition:

The content of units (a) in the copolymer (A) is preferably at least 30 mol %, more preferably at least 40 mol %, particularly preferably at least 50 mol %, to the total of all units. When the content of units (a) is at least the above lower limit value, heat resistance will be excellent.

The upper limit of the content of units (a) is not particularly limited, and it can be suitably set in consideration of the balance with other units other than units (a). In a case where the copolymer (A) contains other units other than units (a), from such a viewpoint that effects of other units (for example, mechanical strength) can be sufficiently exhibited, the content of units (a) in the copolymer (A) is preferably at most 99.5 mol %, more preferably at most 98 mol %, particularly preferably at most 97 mol %, to the total of all units.

In a case where the copolymer (A) is an E/TFE copolymer (ETFE) having units E, the molar ratio (units (a)/units E) of units (a) to units E in the copolymer (A) is preferably from 30/70 to 70/30, preferably from 35/65 to 65/35, particularly preferably from 40/60 to 61/39. When units (a)/units E is at least the lower limit value in the above range, heat resistance will be good, and when it is at most the upper limit value, the mechanical strength will be good.

The total content of units (a) and units E in the E/TFE copolymer is preferably from 80 to 99.5 mol %, more preferably from 82 to 98.4 mol %, particularly preferably from 85 to 97 mol %, based on the total of all units. When the content of the total of units (a) and units E is at least the lower limit value in the above range, it is possible to achieve both good heat resistance and good mechanical strength, and when it is at most the upper limit value, other units can be sufficiently contained, and effects due to such other units will be sufficiently obtained.

In a case where the copolymer (A) is an E/TFE copolymer and further contains units HFP, the content of units HFP in the copolymer (A) is preferably from 4 to 19 mol %, particularly preferably from 6 to 15 mol %, to the total of all units. When the content of units HFP is at least the lower limit value in the above range, the melting point of the copolymer (A) tends to be at most 230° C., and when it is at most the upper limit value, heat resistance will be excellent without impairing the mechanical strength.

In the case where the copolymer (A) is a TFE/HFP copolymer (FEP) having units HFP, the molar ratio of units (a) to units HFP in the copolymer (A) (units (a)/units HFP) is preferably from 60/40 to 97/3, particularly preferably from 70/30 to 95/5. When units (a)/units HFP is at least the lower limit value in the above range, the melting point tends to be at most 290° C. while maintaining the heat resistance, and when it is at most the upper limit value, melt moldability will be excellent.

The total content of units (a) and units HFP in the TFE/HFP copolymer is preferably from 70 to 99.5 mol %, particularly preferably from 80 to 97 mol %, to the total of all units. When the total content of units (a) and units HFP is at least the lower limit value in the above range, heat resistance will be excellent, and when it is at most the upper limit value, it is possible to sufficiently contain other units, and effects due to such other units will be sufficiently obtained.

In the case where the copolymer (A) is a TFE/PFVE copolymer (PFA) having PFVE units, the molar ratio of units (a) to units PFVE in the copolymer (A) (units (a)/units PFVE) is preferably from 70/30 to 99/1, particularly preferably from 85/15 to 99/1. When units (a)/units PFVE is at least the lower limit value in the above range, heat resistance will be good, and when it is at most the upper limit value, melt-moldability will be good.

The total content of units (a) and units PFVE in the TFE/PFVE copolymer is preferably from 70 to 99 mol %, particularly preferably from 80 to 97 mol %, based on the total of all units. When the total content of units (a) and units PFVE is at least the lower limit value in the above range, heat resistance will be excellent, and when it is at most the upper limit value, it is possible to sufficiently contain other units, and effects due to such other units will be sufficiently obtained.

The copolymer (A) does not contain units (c), or when it contains units (c), the content of units (c) in the copolymer (A) is at most 0.05 mol %, to the total of all units. As the copolymer (A), the content of units (c) is preferably 0 mol %, i.e. particularly preferably, it contains no units (c).

When the content of units (c) in the copolymer (A) is at most the above upper limit value, the composition (X) will be excellent in mechanical properties such as cracking resistance, etc., melt moldability, etc.

In the case where the copolymer (A) contains units (d), the content of units (d) in the copolymer (A) is preferably from 0.03 to 5 mol %, more preferably from 0.05 to 4 mol %, particularly preferably from 0.1 to 3 mol %, to the total of all units. When the content of units (d) is at least the lower limit value in the above range, the composition (X) will be excellent in adhesion to another material such as to a non-fluorinated thermoplastic resin, and when the content is at most the upper limit value, it shows excellent adhesion without impairing heat resistance.

In the case where the copolymer (A) contains units (e), the content of units (e) in the copolymer (A) is preferably from 0.1 to 20 mol %, more preferably from 0.2 to 15 mol %, particularly preferably from 0.3 to 10 mol %, based on the total of all units.

In the case where the copolymer (A) has units (e1), the content of units (e1) is preferably from 0.1 to 20 mol %, more preferably from 0.2 to 15 mol %, particularly preferably from 0.3 to 10 mol %, based on the total of all units.

When the content of units (e) is at least the lower limit value in the above range, stress cracking resistance, etc. will be excellent, and when it is at most the upper limit value, the productivity (polymerizability) will be excellent, while showing good heat resistance.

Melting Point:

The melting point of the copolymer (A) is preferably from 120 to 230° C., particularly preferably from 140 to 200° C.

When the melting point of the copolymer (A) is at most the upper limit value in the above range, melt-moldability of the composition (X) will be excellent. Further, in a case where the composition (X) and a non-fluorinated thermoplastic resin are laminated under heating by melt-molding, hot pressing or the like, it is possible to obtain a laminate without thermal decomposition, etc. of the non-fluorinated thermoplastic resin.

When the melting point of the copolymer (A) is at least the lower limit value in the above range, the mechanical properties of the composition (X) will be excellent. Further, the layer of the composition (X) and the layer of the non-fluorinated thermoplastic resin will be bonded by a strong adhesive force by the heat at the time of forming the laminate as described above.

The melting point of the copolymer (A) may be adjusted by the types or contents of units constituting the copolymer (A), the molecular weight, etc. For example, as the ratio of units (a) is increased, the melting point tends to go up. Further, as the ratio of units HFP is increased, the melting point tends to fall.

Q Value:

The Q value of the copolymer (A) is preferably from 0.1 to 300 mm$^3$/sec, particularly preferably from 1 to 120 mm$^3$/sec. When the Q value is at least the lower limit value in the above range, the composition (X) will be excellent in melt moldability, and when it is at most the upper limit value, mechanical properties will be excellent.

The Q value is an index representing the melt flowability of the resin component and will also be an index for the molecular weight of the resin component. That is, as the Q value becomes larger, the molecular weight of the resin component becomes lower, and as the Q value becomes smaller, the molecular weight becomes higher.

(Copolymer (B))

The copolymer (B) has units (a), units (b) and units (c).
The copolymer (B) may further have units (d).
The copolymer (B) may further have units (e).

The monomers (a) to (e) are, respectively, the same ones as shown above in the copolymer (A), and their preferred embodiments are also the same as those in the copolymer (A).

Units (b) in each of the copolymer (A) and the copolymer (B) may be the same or different.

From the viewpoint of melt-kneading the copolymers, it is preferred that the viscosities during kneading are close to each other. When the melting points are similar to each other, the viscosities during kneading are close to each other. Therefore, units (b) in the copolymer (A) and units (b) in the copolymer (B) are preferably the same. For example, when the copolymer (A) is an E/TFE copolymer, it is preferred that the copolymer (B) is also an E/TFE copolymer. When the copolymer (A) is an E/TFE copolymer having units HFP, it is preferred that the copolymer (B) is also an E/TFE copolymer having units HFP.

When units (b) in the copolymer (A) and units (b) in the copolymer (B) are the same, the amounts of units (b) in the respective copolymers may be the same or different.

Specific examples of the copolymer (B) include the followings.

TFE/E/DV copolymer,
TFE/E/DVE copolymer,
TFE/E/FDVE copolymer,
TFE/E/DV/CH$_2$=CH(CF$_2$)$_4$F copolymer,
TFE/E/DVE/CH$_2$=CH(CF$_2$)$_4$F copolymer,
TFE/E/FDVE/CH$_2$=CH(CF$_2$)$_4$F copolymer,
TFE/E/HFP/DV copolymer,
TFE/E/HFP/DV/CH$_2$=CH(CF$_2$)$_4$F copolymer,
TFE/E/HFP/DVE copolymer,
TFE/E/HFP/FDVE/CH$_2$=CH(CF$_2$)$_4$F copolymer,
TFE/HFP/DV copolymer,
TFE/HFP/DVE copolymer,
TFE/HFP/FDVE/CH$_2$=CH(CF$_2$)$_4$F copolymer,
TFE/HFP/FDVE/CF$_2$=CF—O—(CF$_2$)$_4$F copolymer,
TFE/PPVE/DV copolymer,
TFE/PPVE/DVE copolymer,
TFE/PPVE/FDVE copolymer.

Here, "DV", "DVE" and "FDVE" represent the following monomers. Here, n2 is 4 or 6.

DV: CH$_2$=CH—(CF$_2$)$_{n2}$—CH=CH$_2$,

DVE: CH$_2$=CH—O—(CF$_2$)$_{n2}$—O—CH=CH$_2$,

FDVE: CF$_2$=CF—O—(CF$_2$)$_{n2}$—O—CF=CF$_2$

As units (b), the copolymer (B) preferably has units E and particularly preferably has units E and units HFP.

The copolymer (B) preferably further has units (e1).

The copolymer (B) may have a functional group such as alkoxycarbonyl group, an alkoxycarbonyloxy group, a hydroxy group, a carboxy group, a carbonyl fluoride group, etc. at a terminal of the molecular chain composed of repeating units.

Composition:

In the copolymer (B), the preferred ranges of the content of units (a), the content of units (b) and the content of units (e), are, respectively, the same as the preferred ranges in the copolymer (A).

The content of units (c) in the copolymer (B) is from 0.1 to 2 mol %, preferably from 0.2 to 1.5 mol %, more preferably from 0.3 to 1.5 mol %, particularly preferably from 0.4 to 1 mol %, to the total of all units. When the content of units (c) is at least the lower limit value in the above range, the melt tension of the composition (X) tends to be sufficiently high and will be excellent in elongation deformability, and when it is at most the upper limit value, mechanical properties such as cracking resistance, etc. and melt moldability, etc., will be excellent.

The copolymer (B) preferably contains no units (d), or if it contains units (d), the content of units (d) is preferably at most 0.5 mol % to the total of all units. As the copolymer (B), it is particularly preferred that the content of units (d) is 0 mol %, i.e. it contains no units (d). When the content of units (d) is at most the upper limit value in the above range, it becomes possible for the composition (X) to exhibit adhesion without impairing the excellent value of X/W. Further, the copolymer containing no units (d) requires less labor or cost for its production, as compared with the copolymer having units (d).

Melting Point:

The melting point of the copolymer (B) is, like the copolymer (A), preferably from 120 to 230° C., particularly preferably from 140 to 200° C.

The melting point of the copolymer (A) and the melting point of the copolymer (B) may be the same or different.

Q Value:

The Q value of the copolymer (B), is preferably at most 2 mm$^3$/sec., particularly preferably at most 1 mm$^3$/sec. When the Q value is at most the above upper limit value, the effect to improve the elongation deformability by the copolymer (B) will be excellent. Therefore, in a smaller amount of the copolymer (B), excellent elongation deformability is obtainable, and by increasing the content of the copolymer (A), it is possible to further improve the melt moldability and mechanical properties.

The lower limit of the Q value of the copolymer (B) is not particularly limited, and it may be zero. Even when the Q value of the copolymer (B) is 0 (no melt flowability), as the copolymer (A) is used in combination, the composition (X) as a whole can be made to have melt flowability.

(Method of Producing the Copolymers)

The copolymer (A) and the copolymer (B) are produced by polymerizing the above-described monomers such as the monomer (a), the monomer (b), etc. The polymerization method of the monomers is not particularly limited, and, for example, a method using a radical polymerization initiator may be used. During such polymerization, a chain transfer agent may be used. Further, as the radical polymerization initiator, a radical polymerization initiator having a carbonyl group may be used.

The copolymer (A) and the copolymer (B) can be prepared by known methods. For example, the copolymer (A) can be prepared by the production method described in WO2006/310583, and the copolymer (B) can be prepared by the production method described in WO2009/096547.

As the radical polymerization initiator, the temperature at which its half-life is 10 hours is preferably from 0 to 100° C., more preferably from 20 to 90° C. Specific examples include azo compounds such as azobisisobutyronitrile, etc., non-fluorinated diacyl peroxides such as isobutyryl peroxide, octanoyl peroxide, benzoyl peroxide, lauroyl peroxide, etc., peroxydicarbonates such as diisopropyl peroxy dicarbonate, etc., peroxy esters such as t butyl peroxypivalate, t-butyl peroxyisobutyrate, t-butyl peroxyacetate, etc., fluorinated diacyl peroxides such as a compound represented by $(Z(CF_2)_rCOO)_2$ (wherein Z is a hydrogen atom, a fluorine atom or a chlorine atom, and r is an integer of from 1 to 10), etc., inorganic peroxides such as potassium persulfate, sodium persulfate, ammonium persulfate, etc.

The polymerization method may, for example, be bulk polymerization, solution polymerization using an organic solvent such as a fluorinated hydrocarbon, a chlorinated hydrocarbon, a fluorinated chlorinated hydrocarbon, an alcohol, a hydrocarbon, suspension polymerization using an aqueous medium and if required, a suitable organic solvent, emulsion polymerization using an aqueous medium and an emulsifier, etc. Preferred is solution polymerization.

The polymerization conditions are not particularly limited. The polymerization temperature is preferably from 0 to 100° C., more preferably from 20 to 90° C. The polymerization pressure is preferably from 0.1 to 10 MPa, more preferably from 0.5 to 3 MPa. The polymerization time may be varied depending upon e.g. the polymerization temperature, polymerization pressure, etc., but is preferably from 1 to 30 hours.

At the time of the polymerization, in order to control the Q value, it is possible to use a chain transfer agent.

The chain transfer agent may, for example, be an alcohol such as methanol, ethanol, etc., a chlorofluorohydrocarbon such as 1,3-dichloro-1,1,2,2,3-pentafluoropropane, 1,1-dichloro-1-fluoroethane, etc., or a hydrocarbon such as pentane, hexane, cyclohexane, etc.

As a copolymer having carbonyl groups, by using a radical polymerization initiator having a carbonyl group or a chain transfer agent having a carbonyl group, it is possible to produce a copolymer having carbonyl groups derived therefrom, at terminal portions of the carbon chain. The radical polymerization initiator having a carbonyl group, may, for example, be the above-mentioned diacyl peroxides, peroxyesters, peroxydicarbonates, etc. In particular, a peroxydicarbonate such as diisopropyl peroxydicarbonate or di-n-propyl peroxydicarbonate, is preferred.

Further, when a radical polymerization initiator having a carbonyl group is used, depending on conditions such as the type, decomposition temperature, etc. of the radical polymerization initiator, carbon dioxide may be detached during the decomposition to form a radical having no carbonyl group. In such a case, in the resulting copolymer, no carbonyl group derived from a radical polymerization initiator will be present.

The chain transfer agent having a carbonyl group may, for example, be a chain transfer agent having a functional group such as an ester group, a carbonate group, a hydroxy group, a carboxy group or a carbonyl fluoride group. Specifically, a carboxylic acid or its derivative may be mentioned, such as acetic acid, acetic anhydride, methyl acetate, etc.

In a copolymer, carbonyl groups derived from a radical polymerization initiator having a carbonyl group or from a chain transfer agent having a carbonyl group are usually in a minor amount. Therefore, in order to produce a copolymer having a sufficient number of carbonyl groups as the copolymer (A), it is preferred to copolymerize the monomer (d). On the other hand, since the presence of carbonyl groups is not essential in the copolymer (B), it is possible to produce the copolymer (B) having carbonyl groups by using a radical polymerization initiator having a carbonyl group or a chain transfer agent having a carbonyl group, without using the monomer (d).

(Other Components)

The composition (X) of the present invention contains the copolymer (A) and the copolymer (B), and, as the case requires, it may further contain a component other than those.

As a component other than the copolymer (A) or the copolymer (B), a resin component other than the copolymer (A) or the copolymer (B), or an additive component other than a resin, may, for example, be mentioned.

The resin component other than the copolymer (A) or the copolymer (B) may, for example, be a melt-moldable fluororesin other than the copolymer (A) or the copolymer (B), or a melt moldable synthetic resin other than a fluororesin. The melt-moldable synthetic resin other than a fluororesin is preferably a heat-resistant polymer. The additive component other than a resin may, for example, be a powdery filler, a reinforced fiber, a stabilizer, etc. In particular, a heat-resistant polymer such as polyimide, polyphenylene sulfide (PPS), etc., a filler e.g. a pigment such as titanium oxide, or a conductive powder such as carbon black, carbon fiber, a copper stabilizer such as copper powder, copper oxide, copper iodide, etc. boron nitride, talc, sericite, diatomaceous earth, silicon nitride, fine silica, alumina, zirconia, quartz powder, kaolin, bentonite, a nucleating agent for foam molding such as titanium oxide, may be mentioned.

(Composition)

In the composition (X), the mass ratio (A/B) of the copolymer (A) to the copolymer (B) is from 60/40 to 99/1, preferably from 70/30 to 98/2, more preferably from 80/20 to 97/3, particularly preferably from 85/15 to 97/3. When A/B is at least the lower limit value in the above range, the composition (X) will be excellent in adhesion to another material such as to a non-fluorinated thermoplastic resin, mechanical properties, melt moldability, etc. and when it is at most the upper limit value, the composition (X) will be excellent in elongation deformability.

Here, whether or not A/B in the composition (X) is in the above range, can be confirmed by adding a solvent which can dissolve the copolymer (A), to the composition (X), and by separating the copolymer (A) and the copolymer (B). That is, the copolymer (A) is soluble, since the content of units (c) is at most 0.1 mol %, in any solvent such as isophorone, 3',5'-bis(trifluoromethyl) acetophenone, other fluorinated benzonitrile, fluorinated benzoic acid, fluorinated benzoic acid ester, fluorinated nitrobenzene, a fluorinated phenyl alkyl alcohol, fluorinated phenol, an ester of fluorinated phenol, a fluorinated aromatic ketone, etc. Whereas, the copolymer (B) is not soluble in the above solvent and will remain as insoluble matter (gel fraction). From the mass of the copolymer (A) dissolved in the solvent, and the mass of the copolymer (B) not dissolved in the solvent, it is possible to determine A/B.

The total content of the copolymer (A) and the copolymer (B) in the composition (X) is preferably at least 0.5 mass %, more preferably at least 1 mass %, particularly preferably at least 3 mass %, to the total mass of the composition (X). If the total content of the copolymer (A) and the copolymer (B) is at least the above lower limit value, the composition (X) will be excellent in adhesion to another material, elongation deformability, etc.

The upper limit value of the total content of the copolymer (A) and the copolymer (B) is not particularly limited, and may be 100 mass %.

Here, in a case where the composition (X) contains another component, the total content of the copolymer (A) and the copolymer (B) in the composition (X), can be obtained by extracting and separating each component by a soluble solvent (in the same manner as described above).

(Q Value)

The Q value of the composition (X) is from 0.5 to 100 $mm^3$/sec., preferably from 1 to 90 $mm^3$/sec., particularly preferably from 1 to 80 $mm^3$/sec. When the Q value is at least the lower limit value in the above range, the composition (X) will be excellent in melt moldability, and when it is at most the upper limit value, the composition (X) will be excellent in mechanical properties.

The Q value of the composition (X) can be adjusted by the respective Q values of the copolymer (A) and the copolymer (B), A/B, etc.

(Content of Carbonyl Groups)

The content of carbonyl groups in the total of the copolymer (A) and the copolymer (B) contained in the composition (X) (the number of carbonyl groups per $1 \times 10^6$ carbon atoms as the number of carbon atoms in the molecular chain composed of repeating units) is preferably from 1,400 to 5,000, more preferably from 1,500 to 4,000, particularly preferably from 1,500 to 3,000. When the content of carbonyl groups is at least the lower limit value in the above range, adhesion to another material such as to a non-fluorinated thermoplastic resin will be excellent, and when it is at most the upper limit value, it is possible to prevent coloration due to thermal degradation.

In the measurement of carbonyl groups, the copolymer (A) and the copolymer (B) are kneaded so as to obtain the same A/B as in the composition (X) and the obtained kneaded product is molded into a film, which is then subjected to an infrared absorption spectrum analysis using a Fourier transform infrared spectroscope. The absorption peak of the C=O stretching vibration attributable to carbonyl groups is measured, and the content of carbonyl groups is calculated from the measured value.

The measurement of the absorption peak and the calculation of the content of carbonyl groups from the measured value, can be carried out in the same manner as that in the case of the copolymer (A).

The content of carbonyl groups can be adjusted by the content of carbonyl groups in the copolymer (A), the A/B ratio, etc.

(X/W)

The ratio (X/W) of the melt tension X (N) to the load W (N) at the time of measuring the melt tension X is preferably from $0.35 \times 10^{-4}$ to $2.0 \times 10^{-4}$ [N/N], more preferably from $0.38 \times 10^{-4}$ to $1.8 \times 10^{-4}$, particularly preferably from $0.38 \times 10^{-4}$ to $1.6 \times 10^{-4}$.

When X/W is at least the lower limit value in the above range, elongation deformability will be excellent, and when it is at most the upper limit value, mechanical properties, adhesion to another material such as to a non-fluorinated thermoplastic resin, etc. will be excellent.

X/W can be adjusted by the content of units (c) in the copolymer (B), A/B, etc. For example, if the content of units (c) in the copolymer (B) is within the above range, there is a tendency that X/W becomes large as the content of units (c) is large. Further, X/W tends to be large as the value of A/B is smaller (the ratio of the copolymer (B) is higher).

(MIT Flex Number)

The MIT flex number of the composition (X) varies depending on the types and contents of units contained, respectively, in the copolymer (A) and the copolymer (B), but is typically from 1,000 to 100,000 times.

When it is used in applications where mechanical properties such as cracking resistance, etc. are required, the MIT flex number of the composition (X) is preferably from 10,000 to 100,000 times, more preferably from 20,000 to 100,000 times, particularly preferably from 30,000 to 80,000 times. When the MIT flex number is at least the lower limit value in the above range, the composition (X) will be excellent in mechanical properties, and, for example, even if the layer of the composition (X) is bent repeatedly, the material is less likely to break.

The MIT flex number may be adjusted by the MIT flex number of the copolymer (A1) alone, the content of units (c) in the copolymer (B), A/B, etc. For example, as the MIT flex number of the copolymer (A1) alone becomes larger, the MIT flex number of the composition (X) becomes larger. When the content of units (c) in the copolymer (B) is within the above range, as the content of units (c) becomes smaller, the MIT flex number tends to be larger. Further, as the value of A/B becomes larger (the ratio of the copolymer (B) becomes smaller), the MIT flex number tends to be larger.

The MIT flex number of the copolymer (A1) alone may be increased, for example, by increasing the molecular weight of the copolymer (A1) or increasing the content of the monomer (e1).

(Production Method of Composition (X))

The composition (X) can be produced by melt-kneading the copolymer (A), the copolymer (B) and, as the case requires, another resin component. At the time of melt-kneading, an additive component may be blended. The melt-kneading can be carried out by a known method.

As the copolymer (A) and the copolymer (B), respectively, if desired copolymers are commercially available, such commercial products may be used, or, as described above, they may be produced by suitable methods such as polymerization from a variety of starting compounds.

(Advantageous Effects)

In the composition (X) as described above, the copolymer (A) has carbonyl groups, whereby it can exhibit excellent adhesion to a material other than a fluororesin. For example, if the composition (X) and a non-fluorinated thermoplastic resin are laminated under heating by melt-molding, hot pressing or the like, it is possible to obtain a laminate having an interlayer strongly bonded.

Normally, when a highly adhesive component and a low adhesive component are mixed, as the ratio of the low adhesive component increases, adhesion of the resulting mixture tends to be low. However, in the present invention, surprisingly, even in a case where the copolymer (B) does not have a carbonyl group, as long as A/B is within the above-mentioned range, the composition (X) is capable of exhibiting the same level of adhesion as in the case where the copolymer (A) is used alone.

In the present invention, by using the copolymer (A) and the copolymer (B) in combination so as to bring A/B and the Q value to be within the above-mentioned ranges, it is possible to make all of the elongation deformability, the melt-moldability and the mechanical properties of the composition (X) to be excellent.

That is, the monomer (c) becomes a branch point of the molecular chain composed of repeating units. The copolymer (B) has the branched structure (c) introduced and thus has a higher melt tension than the copolymer (A) and is excellent in elongation deformability. The copolymer (A) has, as its content of units (c) is at most the above-mentioned upper limit value, a higher melt fluidity than the copolymer (B), and also tends to have better mechanical properties than the copolymer (A). By using the copolymer (A) and the copolymer (B) in combination so as to bring A/B and the Q value to be within the above-mentioned ranges, the respective excellent properties will be sufficiently exhibited.

In the case of a copolymer having both carbonyl groups and units (c), by adjusting the unit composition, etc., alone, it is possible to make the elongation deformability, the melt-moldability and the mechanical properties to be excellent to some extent. However, with the composition (X) comprising the copolymer (A) having carbonyl groups and the copolymer (B) having units (c), it is easier to adjust the elongation deformability, melt-moldability, mechanical properties, etc. Further, with the composition (X), it is possible to accomplish better mechanical properties.

For example, in the case of the copolymer having both carbonyl groups and units (c), in order to ensure the melt fluidity, the content of units (c) is required to be in a trace amount, and thus, there is a limit in the improvement of elongation deformability. Further, if the content of units (c) is increased in order to improve the elongation deformability, the melt fluidity tends to be reduced, and the material becomes brittle so that the mechanical properties will be reduced. Therefore, from the viewpoint of the balance of these respective characteristics, selections of the monomer composition are largely limited. Whereas in the case of the composition (X), by increasing the content of units (c) in the copolymer (B), an excellent effect to improve elongation deformability can be obtained even in a small amount. Therefore, by blending a minor amount of the copolymer (B) to the copolymer (A), it is possible to improve the elongation deformability while sufficiently securing the melt-moldability and mechanical properties.

(Applications)

The applications of the composition (X) are not particularly limited. From the viewpoint of exhibiting the above-mentioned advantageous effects, the composition (X) is preferably used in applications to produce a variety of articles by laminating it with other materials.

Other materials may, for example, be a fluororesin other than the copolymer (A) and the copolymer (B), a non-fluorinated thermoplastic resin, a metal (iron, stainless steel, aluminum, etc.), glass, ceramics, etc. From the viewpoint of usefulness of the present invention, a non-fluorinated thermoplastic resin is preferred.

In the present invention, the term "thermoplastic resin" is used not only to mean a usual thermoplastic resin, but also to include a thermoplastic elastomer.

As the non-fluorinated thermoplastic resin, the following ones may, for example, be mentioned.

Usual non-fluorinated thermoplastic resins include a polyolefin resin such as polyethylene (high density polyethylene, medium density polyethylene, low density polyethylene, ultra low density polyethylene), polypropylene, polybutene, polybutadiene, an α-olefin-ethylene copolymer, etc.; a polyester resin such as polybutylene terephthalate, polyethylene terephthalate, polyethylene isophthalate, polyethylene naphthalate, etc.; a polyurethane resin such as thermoplastic polyurethane, etc.; a polyvinyl acetate resin such as polyvinyl acetate, an ethylene/polyvinyl acetate copolymer, etc.; a polyvinyl alcohol resin such as polyvinyl alcohol, a vinyl alcohol/ethylene copolymer, etc.; a polyvinyl chloride resin such as polyvinyl chloride, polyvinylidene chloride, a vinyl chloride/vinylidene chloride copolymer, etc.; a polyacrylate resin such as polymethyl acrylate, polyethyl acrylate, etc.; a polymethacrylate resin such as polymethyl methacrylate, polyethyl methacrylate, etc.; a polystyrene resin such as polystyrene, poly α-methylstyrene, etc.; a polynitrile-type resin such as polyacrylonitrile, polymethacrylonitrile, an acrylonitrile/styrene copolymer, a methacrylonitrile/styrene copolymer, a methacrylonitrile/styrene/butadiene copolymer, etc.; a polyamide resin such as nylon 11, nylon 12, nylon 610, nylon 612, nylon 66, nylon 46, etc.; a polyimide resin such as polyimide, polycarbonate, polyether ether ketone, polyetherimide, polyether ketone, polyether sulfone, polythioether sulfone, polyether nitrile, polyphenylene ether, etc.

As the non-fluorinated thermoplastic elastomer, a polyether-type or polyester-type polyurethane thermoplastic elastomer; a polyolefin thermoplastic elastomer such as an ethylene/propylene copolymer, an ethylene/propylene/diene copolymer, etc.; a polyester thermoplastic elastomer; a polystyrene-type thermoplastic elastomer such as a styrene/ethylene/butylene block copolymer, a styrene/ethylene/propylene block copolymer, a styrene/isoprene copolymer, etc.; a polyamide thermoplastic elastomer, etc. may be mentioned.

Among the above non-fluorinated thermoplastic resins, a polyurethane-type thermoplastic resin or thermoplastic elastomer, a polyester-type thermoplastic resin or thermoplastic elastomer, or a polyolefin-type thermoplastic resin or thermoplastic elastomer, is preferred.

The melting point of the non-fluorinated thermoplastic resin is preferably from 120 to 230° C., particularly preferably from 140 to 200° C. In the case of a non-fluorinated thermoplastic resin, of which the melting point is not clear, in place of the melting point, the flow starting temperature is preferably in this range.

Here, the flow starting temperature is measured as follows. An orifice with a diameter of 2.1 mm and a length of 8 mm is set on a flow tester manufactured by Shimadzu Corporation; then, a thermoplastic resin of interest is filled; while exerting a load of 68.7N, the thermoplastic resin is heated; and a temperature at which the thermoplastic resin begins to flow out from the orifice is determined as the flow starting temperature.

The non-fluorinated thermoplastic resin preferably has a functional group capable of reacting with a carbonyl group to form a chemical bond (hereinafter referred to also as a "reactive functional group").

The reactive functional group may, for example, be an amino group, an isocyanate group, a hydroxy group, an epoxy group, an alkoxycarbonyl group, etc. and an amino group or an epoxy group is preferred. The reactive functional group of the non-fluorinated thermoplastic resin may be one type, or two or more types.

As the non-fluorinated thermoplastic resin having a reactive functional group, a commercial product may be used, or one produced by a known production method may be used.

As the article obtainable by laminating the composition (X) and another material, the following multi-layer laminate is preferred.

A multilayer laminate comprising a laminate [(I)/(II)] wherein a layer (I) made of the composition (X) and a layer (II) containing a non-fluorinated thermoplastic resin (hereinafter referred to also as "resin (C)") having a reactive functional group, are directly bonded.

The resin (C) and the reactive functional group in the resin (C) may be the same as those described above.

The layer (II) may be a layer made solely of the resin (C) or may be a layer further containing a component other than the resin (C). The component other than the resin (C) may, for example, be a polyester such as polyethylene terephthalate (PET), polybutylene terephthalate (PBT), polycarbonate (PC), polyethylene naphthalate (PEN), polybutylene naphthalate (PBN), etc.; a polyolefin such as polyethylene (PE), polypropylene (PP), etc; a fluororesin such as polyvinylidene fluoride (PVDF), polychlorotrifluoroethylene (PCTFE), an ethylene/tetrafluoroethylene copolymer (ETFE), an ethylene/chlorotrifluoroethylene copolymer (ECTFE), a tetrafluoroethylenehexafluoropropylene copolymer (FEP), a tetrafluoroethylene/hexafluoropropylene/vinylidene fluoride copolymer (THV), a tetrafluoroethylenelperfluoro(alkyl vinyl ether) copolymer (PFA), etc.; a polyamide such as polyamide 6, polyamide 66, polyamide 46, polyamide 11, polyamide 12, polyamide MXD6 (semi-aromatic polyamide), etc.; poly(ethylenelvinyl acetate), poly (vinyl acetate), polyvinyl alcohol (PVA), poly(ethylene/vinyl alcohol), polystyrene, polyvinylidene chloride, polyacrylonitrile, polyoxymethylene, polyphenylene sulfide, polyphenylene ether, polyimide, polyamideimide, polyetherimide, polysulfone, polyarylate, etc.

The laminate [(I)/(II)] is preferably one having the layer (I) and the layer (II) bonded under heating, i.e. heat laminated.

When the laminate [(I)/(II)] is formed by heat lamination, the laminate [(I)/(II)] will be a laminate having its interlayer very strongly bonded. This is considered to be such that, by the lamination under heating, carbonyl groups in the copolymer (A) contained in the layer (I) and the reactive functional groups (amino groups, epoxy groups, etc.) in the resin (C) contained in the layer (II) are reacted and bonded at the lamination interface.

The multilayer laminate may further contain a layer of another resin other than the copolymer (A), the copolymer (B) and the resin (C).

The laminate [(I)/(II)] has, in particular in the layer (II), reactive functional groups such as amino groups, epoxy groups, etc. in the resin (C), and thus has good adhesion to many other resins, in particular to thermoplastic resins. Therefore, when a layer (III) made of another resin is heat-laminated on the layer (II) of the laminate [(I)/(II)], both layers are firmly bonded to each other, whereby it is possible to form a three layered multilayer [(I)/(II)/(III)] having interlayers strongly bonded. Further, in the same manner, it is possible to form a four- or more-layered multi-layer laminate [(I)/(II)/(III)/(IV)], [(I)/(II)/(III)/(IV)/(V)] . . . including the laminate [(I)/(II)]. In this manner, by laminating any desired thermoplastic resin using the laminate [(I)/(II)] as the base, it is possible to form a multilayer laminate excellent in mechanical strength and chemical liquid barrier properties, easily and at low cost.

As such another resin, a thermoplastic resin is preferred. The thermoplastic resin is not particularly limited, and any thermoplastic resin may be selected for use depending on the purpose. For example, a single substance such as polyethylene (high density polyethylene, medium density polyethylene, low density polyethylene, ultra low density polyethylene), polypropylene, polybutene, polybutadiene, an ABS resin, polystyrene, a methacrylic resin, a norbornene resin, polyvinyl chloride, polyvinylidene chloride, a polyester such as polybutylene terephthalate, polyethylene terephthalate, polyethylene naphthalate, etc., polycarbonate, polyamide, polyimide, thermoplastic polyimide, polyaminobismaleimide, polysulfone, phenylene sulfide, polyether ether ketone, polyether imide, polyether ketone, polyether sulfone, polythioether sulfone, polyether nitrile, polyphenylene ether, or a mixture of such single substances, or a mixture of carbon black, a various elastomeric component, glass fiber, carbon fiber, etc. using such a single substance or a mixture of single substances, as a matrix, may be mentioned. By using such other resins, as the layers (III), (IV), (V) . . . , it is possible to form a multilayer laminate.

The thickness of the layer (I) is preferably from 5 μm to 5,000 μm, more preferably from 50 μm to 500 μm.

The thickness of the layer (II) is preferably from 5 μm to 1.5 cm, more preferably from 50 μm to 1 cm.

The thickness of the overall multi-layer laminate can be arbitrarily set depending on the purpose, but is usually preferably from 10 μm to 2 cm, more preferably from 50 μm to 1 cm.

The shape of the multi-layer laminate is not particularly limited, and may, for example, be various shapes such as films, sheets, belts, tubes, hoses, tanks, bottles, electric wire covering resins, foamed electric wire covering resins, foamed molded products, etc.

As a method for producing the multilayer laminate, from the viewpoint of molding efficiency and productivity, it is possible to suitably apply a method including thermal lamination, such as multi-layer extrusion (co-extrusion molding), extrusion lamination molding, lamination molding using a heating roll, a heat press, etc., multilayer injection molding, multilayer blow molding, etc.

The thermal lamination is preferably carried out by multilayer extrusion molding, multilayer injection molding, multilayer blow molding, melt molding such as heat fusion between films, etc., and it is particularly preferably carried out by multilayer extrusion molding.

In the multilayer extrusion molding, the copolymer (A), the resin (B) and, as the case requires, other thermoplastic resins, are discharged from discharge ports of different extruders and passed through a die while being contacted with one another in a molten state, whereby it is possible to obtain a multi-layer laminate including a laminate [(I)/(II)].

It is also possible to form a laminate [(I)/(II)] by melt molding such as multi-layer extrusion molding, and then to heat press e.g. a layer (III) thereto, to obtain e.g. a laminate [(I)/(II)/(III)].

The temperature at the time of thermal lamination is adjusted to be within a range of at least the melting point of a fluororesin and lower than the decomposition temperature from the viewpoint of melt-moldability, and is usually preferably from 150 to 400° C. and more preferably from 160 to 390° C. When the temperature at the time of thermal lamination is at least the lower limit value in the above range, the adhesive force based on the reaction of carbonyl groups and the reactive functional groups will be sufficiently expressed. When the temperature at the time of thermal lamination is at most the upper limit value in the above range, it is possible to prevent thermal decomposition, modification, etc. of the thermoplastic resin such as the resin (C), the coloration of the resin, etc.

The composition (X) of the present invention may be molded by a known molding method such as injection molding, extrusion molding, blow molding, press molding, rotational molding, electrostatic coating, etc. The shape of the obtained molded product may, for example, be a sheet-form, a fiber-form, a film-form, a tube form, etc. and is not particularly limited. Further, fibers may, for example, be monofilaments, multifilaments, etc., and their shape is not particularly limited. Further, it is possible to stretch the obtained molded product to form a porous body. Further, it is also possible to form a coating on the obtained molded product, or to form a laminate structure with another resin, etc.

The fibers obtained from the above molded product, may be made into a cloth such as a fabric, a non-woven fabric, a felt, a knitted fabric, etc. The obtained cloth may be used, not only as it is, for clothing, but also as a base material for a composite laminate for protective apparels, etc. or for electrolytic films, etc. When used as the base material, it is preferably a porous material.

Specific applications of the molded product may, for example, be, in the case of garments, etc., a thermostable convective barrier of a flexible fabric composite to be used for e.g. a fire-resistant protective clothing as described in JP-A-2012-525288, a porous support layer of a durable chemical protective material to be used in a chemical protection suit as described in JP-A-2012-519535, a laminate on an outer film surface of a single wall lightweight tent structure as described in JP-A-2012-526937, etc.

Further, the base material for a film, etc. may, for example, be a porous support for a membrane of a membrane electrode assembly to be used for a fuel cell or electrolytic cell as described in JP-A-2014-005471, a non-conductive base material for antistatic coating to be used for clothes or a cable containing such a non-conductive layer, etc. as described in JP-A-2014-513734, or a stretched fluoropolymer having a hydrophilic coating formed, to be used in a medical device such as an electronic wire or cable as described in JP-A-2014-525847. Further, fibers obtained from the molded product may be used for applications as described in paragraphs [0017], [0018], etc. of JP-A-2012-512770.

EXAMPLES

Now, the present invention will be described in detail with reference to Examples. However, the present invention is not limited by the following description.

In the following Ex., Ex. 1-2 to 1-6, Ex. 2-2 to 2-6, Ex. 3-2 to 3-6, and Ex. 4-2 to 4-6, are Examples of the present invention, and Ex. 1-1, Ex. 1-7, Ex. 2-1, Ex. 2-7, Ex. 3-1, Ex. 3-7, Ex. 4-1, and Ex. 4-7 are Comparative Examples.

The evaluation methods used in each of the following Examples are shown below.
[Evaluation Methods]
<Composition of Copolymer>

The molar ratios of the respective units in a copolymer were obtained from the melt NMR measurements and the total fluorine content measurements. However, since the content (mol %) of units (c) is so small that it is difficult to measure it by the above methods, and therefore, it was measured using a pyrolysis gas chromatography. From these results, the composition (contents of respective units) of the copolymer was determined.

It should be noted that the name of units derived from each monomer will be represented by the compound name or its abbreviation followed by "units". For example, units derived from tetrafluoroethylene (abbreviation: TFE) will be represented by "TFE units".
<Melting Point (° C.) of Copolymer>

The melting peak at the time of heating at a rate of 10° C./min. was measured by using SII DSC6220 Model differential scanning calorimeter (manufactured by Seiko Instruments Inc.), and the measured value was adopted as the melting point of the copolymer.
<Q Value ($mm^3$/sec.)>

Using a flow tester (manufactured by Shimadzu Corporation), the extrusion rate ($mm^3$/sec.) at the time of extruding a copolymer from an orifice having a diameter of 2.1 mm and a length of 8 mm under a pressure of $68.7 N/cm^2$ at a temperature of the melting point of the copolymer+50° C., was measured and the measured value was adopted as the Q value.
<Content of Carbonyl Groups>

Carbonyl groups in the copolymer or blend in each of the following Ex. are derived from itaconic anhydride (IAH), and therefore, the content of carbonyl groups was measured in the following procedure.

Further, polymerization initiators (t-butyl peroxypivalate and bis(perfluorobutyryl) peroxide) used in the preparation of the following copolymers, have a carbonyl group in their structures, but when they decompose to generate radicals, carbon dioxide is detached, so that no carbonyl group will be present in the copolymer to be formed.

The copolymer or blend was press-molded at the melting point+50° C., to prepare a film having a thickness of from 1.5 to 2.0 mm. The obtained film was subjected to an infrared absorption spectrum analysis by using a Fourier transform infrared spectrometer (AVATAR 360 manufactured by Nicolet Co.) to measure the intensity of absorption attributable to carbonyl groups appearing in the vicinity of $1,870 \ cm^{-1}$. Using the molar absorbance coefficient of acid anhydride groups obtained from a model compound (IAH: $237 \ L \cdot mol^{-1} \cdot cm^{-1}$), the absorbance of the acid anhydride groups was measured. By the following formula (1), the number (N) of acid anhydride groups per $1 \times 10^6$ carbon atoms as the number of carbon atoms in the molecular chain composed of repeating units, was calculated. Twice the value of calculated N was adopted as the content (the number) of carbonyl groups.

$$N = 500AW/\varepsilon df \qquad \text{Formula (1)}$$

A: absorbance of carbonyl group peak.
$\varepsilon$: molar absorbance coefficient of carbonyl groups $[L \cdot mol^{-1} \cdot cm^{-1}]$.
W: composition average molecular weight calculated from monomer composition.
d: density of the film [$g/cm^3$].
f: thickness of the film [mm].
<X/W>

Measurement of the melt tension X was carried out in accordance with the following procedure by means of a capillograph (manufactured by Toyo Seiki Seisaku-Sho, Ltd.) by using a cone-equipped die having a diameter of 1 mm and a length 10 mm with an inlet angle of 90 degrees.

The copolymer or blend was press-molded at 300° C. to prepare a sheet having a thickness of 1 mm. The sheet was finely cut into squares of about 5 mm, and 5 g of the finely cut sample was put into a barrel set at 300° C. Then, a piston was inserted from above and left to stand for 5 minutes until the copolymer or blend was melted and the barrel temperature was stabilized at 300° C. Then, the piston was lowered at a speed of 5 mm/min, and waited until the load applied to the piston became constant, and after the load became constant, the take-up speed of a take-up device was adjusted to be 2 m/min, and a strand of the copolymer or blend flowed out from the die was slowly led to the take-up device so as not to break the strand, whereby the strand was withdrawn. The withdrawal strength applied at that time was measured for one minute. With respect to the measured withdrawal strength, an average value during the measurement period was calculated, and the calculated value was adopted as the melt tension X (mN).

From the melt tension X and the load W (N) at the time when the load applied to the piston became constant during the measurement, the value of X/W [N/N] was calculated.

<Uniformity of Strand Diameter>

Using a capillograph (manufactured by Toyo Seiki Seisaku-Sho, Ltd.), from a die having a diameter of 2 mm and a length of 10 mm, at a piston speed of 5 mm/min, the fluorinated copolymer was extruded at a temperature of the melting point+50° C., and the strand was withdrawn at a take-up speed of 1 m/min. At that time, a case where the thickness of the strand diameter periodically changes and the change rate exceeds 10%, was evaluated as non-uniform (x), and a case where the change rate is less than 10%, was evaluated as uniform (◯). In addition, a case where there is roughness on the strand surface, was regarded as non-uniform (x) in the evaluation of uniformity of strand diameter. One having higher uniformity of strand diameter has a smaller degree of extension by its own weight at the time of melting. Therefore, it is suitable for a mold processing method involving elongation deformation such as blow molding.

<MIT Flex Number>

The copolymer or blend was press-molded at the melting point+50° C. to prepare a film having a thickness of 0.23 mm, and the film was punched out into a strip shape of 12.5 mm in width×130 mm in length to prepare a test specimen.

In accordance with ASTM D-2176, a MIT bending test of the test specimen was carried out, and the MIT flex number was measured. That is, the test specimen was mounted on a MIT measuring instrument manufactured by Toyo Seiki Seisaku-Sho, Ltd., and the test specimen was bent under conditions of a load of 12.3N, a bending angle of 135 degrees at each of left and right, and the bending number of times being 175 times/min., and the number of times (the MIT flex number) when the test specimen underwent breakage, was measured.

This test is a bending fatigue resistance test, and the MIT flex number becomes an index for cracking resistance of the copolymer or blend. As the MIT flex number becomes large, the cracking resistance becomes better.

<Adhesive Strength (Press→Heat Sealing→Peel Test)>

The copolymer or blend was press-molded to prepare a film having a thickness of 100 μm, and the film was punched out into a strip shape of 1 cm in width×10 cm in length to prepare a sample for measurement.

The measurement sample obtained, and a nylon film having the same size (nylon 12, manufactured by Ube Industries, Ltd., Grade: 3030JI6L, thickness: 200 μm), were laminated and melt-bonded by an impulse heat sealer (manufactured by FUJIIMPULSE CO., LTD.) set at a heating level 7 (270° C.) for 15 seconds to obtain a laminated film. The obtained laminated film was cut into a strip shape of 5 cm in length and 1 cm in width, to prepare a test specimen. An end portion of the test specimen was fixed to a chuck of a tensile tester (manufactured by Orientec Co., Ltd.), and the peel strength (N/cm) when peeled at 180° was measured.

Production Example 1

A polymerization tank having an internal volume of 94 liters and equipped with a stirrer, was deaerated, and 71.3 kg of 1-hydrotridecafluorohexane (hereinafter referred to as "HTFH"), 20.4 kg of 1,3-dichloro-1,1,2,2,3-pentafluoropropane (hereinafter referred to as "AK225cb", manufactured by Asahi Glass Company, Limited), 562 g of $CH_2=CH(CF_2)_4F$ (hereinafter referred to as "PFBE".) and 3.4 g of IAH (i.e. itaconic anhydride) were charged, whereupon the inside of the polymerization tank was heated to 66° C. Then, a monomer mixed gas with a composition of TFE/E being 89/11 by molar ratio, was charged and the pressure was raised to 1.5 MPa. As a polymerization initiator, 1 L of a 0.5% HTFH solution of t-butyl peroxypivalate was charged to initiate polymerization. The pressure decreases along with the progress of polymerization, and therefore, a monomer mixture gas was continuously charged in a molar ratio of TFE/E being 59.5/40.5 so that the pressure became constant at 1.5 MPa. Further, based on the total molar amount of TFE and E to be charged during the polymerization, PFBE in an amount corresponding to 3.3 mol %, and IAH in an amount corresponding to 0.3 mol %, were continuously charged. After 8.5 hours from the initiation of polymerization at the time when 7.3 kg of the monomer mixed gas was charged, the internal temperature of the polymerization tank was cooled to room temperature, and the pressure was purged to normal pressure. A slurry of the copolymer A-1 was thereby obtained.

The obtained slurry was put into a granulation tank of 200 L charged with 77 kg of water and then granulated by raising the temperature to 105° C. with stirring while distilling off the polymerization medium, etc. By drying the obtained granulated product at 150° C. for 15 hours, 7.9 kg of a granulated product of the copolymer A-1 was obtained.

The composition of the obtained copolymer A-1 was 57.1/39.5/0.2/3.2 by molar ratio of TFE units/E units/IAH units/PFBE units. The melting point was 240° C., and the Q value was 41 mm$^3$/sec. The MIT flex number was 52,000 times. The content of carbonyl groups (the number of carbonyl groups per $1×10^6$ carbon atoms as the number of carbon atoms in the molecular chain composed of repeating units; the same applies hereinafter) was 2,060 groups.

Production Example 2

A polymerization tank having an internal volume of 1.4 liters and equipped with a stirrer was deaerated, and 716 g of HTFH, 126 g of AK225cb, 3.3 g of PFBE, 352 g of HFP, 3.5 g of E and 110 g TFE were charged, whereupon the inside of the polymerization tank was heated to 66° C., and the pressure was raised to 1.5 MPa. As a polymerization initiator, 6.7 mL of a 0.5% HTFH solution of t-butyl peroxypivalate was charged to initiate polymerization. The pressure decreased along with the progress of polymerization, and therefore, a monomer mixed gas was continuously charged in a molar ratio of TFE/E being 54/46, so that pressure would be constant at 1.5 MPa. Further, based on the total molar amount of TFE and E to be charged during polymerization, PFBE in an amount corresponding to 1.0 mol % and IAH in an amount corresponding to 0.25 mol % were continuously charged. After 3.5 hours from the initiation of polymerization at the time when 70 g of the monomer mixed gas was charged, the internal temperature of the polymerization tank was cooled to room temperature, and the pressure was purged to normal pressure. A slurry of the copolymer A-2 was thereby obtained.

The obtained slurry was suction filtered through a glass filter and dried at 120° C. for 15 hours, to obtain 83 g of the copolymer A-2.

The composition of the copolymer A-2 was 47.4/43.6/8.4/0.27/0.43 by molar ratio of TFE units/E units/HFPHFP units/IAH units/PFBE units. The melting point was 172° C., and the Q value was 20 mm³/sec. The MIT flex number was 31,000 times. The content of carbonyl groups was 2,650 groups.

Production Example 3

A polymerization tank having an internal volume of 1.4 liters and equipped with a stirrer, was deaerated, and 1,223 g of HTFH, 13 g of methanol (MeOH), 6.7 g of PFBE, and 1.3 g of $CH_2=CH-(CF_2)_6-CH=CH_2$ (hereinafter referred to as "C6-DV") were charged, then, a mixed gas of TFE/E=83/17 mol % was introduced, inside of polymerization tank was heated to 66° C., and the pressure was raised to 1.5 MPa. As a polymerization initiator, 6.7 mL of a 0.5% HTFH solution of t-butyl peroxypivalate was charged to initiate polymerization. The pressure decreases along with the progress of polymerization, and therefore, a monomer mixed gas was continuously charged in a molar ratio of TFE/E of 54/46, so that the pressure would be constant at 1.5 MPa. Further, based on the total molar amount of TFE and E to be charged during polymerization, PFBE in an amount corresponding to 1.5 mol % and C6-DV in an amount corresponding to 0.6 mol % were continuously supplied. After 3.5 hour from the initiation of polymerization at the time when 90 g of the monomer mixed gas was charged, the internal temperature of the polymerization tank was cooled to room temperature and the pressure was purged to normal pressure. A slurry of the copolymer B-1 was thereby obtained.

The obtained slurry was suction filtered through a glass filter and dried at 120° C. for 15 hours, to obtain 87 g of the copolymer B-1.

The charged amount of C6-DV at the time of polymerization (before the initiation of polymerization and during polymerization), was 0.2 mol % based on the total charged amount 100 mol % of TFE and E.

The composition of the copolymer B-1 was 54/46/0.6/1.5 by molar ratio of TFE units/E units/C6-DV units/PFBE units. The melting point was 257° C., and the MIT flex number was 845 times.

Production Example 4

A copolymer B-2 was obtained in the same manner as in Production Example 3 except that C6-DV charged before polymerization initiation was changed to 2.37 g, and based on the total molar amount of TFE and E to be charged during the polymerization, C6-DV in an amount corresponding to 0.8 mol % was continuously charged.

The charged amount of C6-DV during the polymerization was 0.2 mol % relative to total charged amount 100 mol % of TFE and E.

The composition of the copolymer B-2 was 47/43.7/8.3/0.6/0.4 by molar ratio of TFE units/E units/HFP units/C6-DV units/PFBE units. The melting point was 170° C., and the MIT flex number was 845 times.

Production Example 5

A 1 L autoclave equipped with a stirrer was evacuated to a vacuum, and 1,000 g of AK225cb, 2.5 g of methanol, 120 g of PPVE, and 25 g of $CF_2=CFOCF_2CF_2CF_2CF_2OCF=CF_2$ (hereinafter referred to as "C4-FDVE") were charged. The internal temperature of the autoclave was adjusted to 50° C., and TFE was charged up to 0.7 MPa. As an initiator, a 1% solution of bis(perfluorobutyryl) peroxide (solvent AK225cb) was charged to initiate polymerization. As the pressure decreased along with the progress of polymerization, TFE was charged to maintain the pressure to be 0.7 MPa. Further, to the charged TFE 100 mol %, PPVE in an amount corresponding to 1.5 mol % was continuously charged. Since the polymerization tends not to proceed as time passes, the initiator solution was successively charged by 1 mL every time, to let the polymerization proceed. At the time when the TFE amount charged sequentially reached 100 g, the internal temperature of the autoclave was cooled to 10° C. and at the same time, non-polymerized TFE was purged. A slurry of the copolymer A-3 was thereby obtained.

The obtained slurry was suction filtered through a glass filter and dried at 150° C. for 15 hours, to obtain 105 g of the copolymer B-3.

The composition of the copolymer B-3 was 98.4/1.5/0.6 by molar ratio of TFE units/PPVE units/C4-FDVE units. The melting point was 299° C., and the MIT flex number was 643 times.

Production Example 6

97 g of a white copolymer A-3 was obtained by carrying out polymerization in the same manner as in Production Example 5 except that C4-DVE was not charged, and to TFE added along with the progress of polymerization, norbornene anhydride monomer (NAH) was added in a proportion of 0.3 mol %.

A result of measuring the infrared absorption spectrum of the copolymer A-3, no absorption attributable to —CF=CF₂ was detected.

The composition of the copolymer A-3 was 98.3/1.4/0.31 by molar ratio of TFE units/PPVE units/NAH units. The melting point was 300° C., and the MIT flex number was 17,000 times. Further, the content of carbonyl groups was 3,160 groups.

Production Example 7

130 g of a white copolymer B-4 was obtained by carrying out polymerization in the same manner as in Production Example 5 except that 500 g of AK225cb was charged instead of 1,000 g, 0.2 g of methanol was charged instead of 2.5 g, 600 g of HFP was charged instead of PPVE, and no PPVE was used during polymerization.

The composition of the copolymer B-4 was 93.4/6.5/0.6 by molar ratio of TFE units/HFP units/C4-FDVE units. The melting point was 260° C., and the MIT flex number was 510 times.

Production Example 8

120 g of a white copolymer A-4 was obtained by carrying out polymerization in the same manner as in Production Example 7 except that C4-DVE was not charged, and to the TFE gas monomer added along with the progress of polymerization, a norbornene anhydride monomer (NAH) was added in a proportion of 0.3 mol %.

A result of measuring the infrared absorption spectrum of the obtained copolymer A-4, no absorption attributable to —CF=$CF_2$ was detected.

The composition of the copolymer A-4 was 93.4/6.5/0.3 by molar ratio of TFE units/HFP units/NAH units. The melting point was 270° C., and the MIT flex number was 7200 times. Further, the content of carbonyl groups was 3,300 groups.

Reference Example 1

Into a 2l L pressure container equipped with a stirrer, after deaeration, 19.3 kg of HTFH, 0.20 kg of methanol, 0.083 kg of PFBE, 0.032 kg of C6-DV, 2.3 kg of TFE and 0.13 kg of E were charged at room temperature. Then, the temperature was raised to 66° C., and 80 mL of a 2 mass % solution (solvent C6H) of t-butyl peroxypivalate was charged, to initiate polymerization. The pressure decreases along with the progress of polymerization, and therefore, a mixed gas (TFE/E=54/46 molar ratio) was continuously charged so that the pressure would be constant. To the above mixed gas, PFBE at a rate of 1.5 mol %, IAH at a rate of 0.5 mol %, and C6-DV at a rate of 0.07 mol %, were, respectively, continuous charged. At the time when the charged mixed gas amount became 1.5 kg, the internal temperature was cooled to room temperature, unreacted gas was released, and the pressure container was opened. The content of the pressure container was washed with C6H, filtered through a glass filter and dried to obtain 1.5 kg of a copolymer C-1.

The composition of the copolymer C-1 was 54.0/46.0/1.53/0.40/0.05 by molar ratio of TFE units/E units/PFBE units/IAH units/C6-DV units. The Q value was 2.5 $mm^3$/sec. Further, the content of carbonyl groups was 1,950 groups.

Ex. 1-1 to 1-7, Ex. 2-1 to 2-7, Ex. 3-1 to 3-7, Ex. 4-1 to 4-7

Using Laboplastmill (LABO PLASTOMILL, R-30, manufactured by Toyo Seiki Seisaku-Sho, Ltd.), Copolymer (A) and Copolymer (B) shown in Table 1 were dry-blended in such amounts that A/B would be a value as shown in Table 1, and melt-kneaded at the melting point+50° C., of the resin having a higher melting point, at 100 rpm for 10 minutes, to obtain a blend (composition (X)).

With respect to the obtained blend, the Q value, the content of carbonyl groups (the number of carbonyl groups per $1 \times 10^6$ carbon atoms as the number of carbon atoms in the molecular chain composed of repeating units), X/W, the uniformity of strand diameter, the MIT flex number and the adhesive strength were evaluated. The results are shown in Tables 1 and 2.

The load W, and the maximum value, minimum value and average value (i.e. melt tension X) of the withdrawal strength, obtained at the time of evaluation of X/W, are also shown in Tables 1 and 2.

With respect to Copolymer C-1 in Reference Example 1, the same evaluations were conducted. The results are shown in Table 1 (the units in the respective evaluation items are the same as in Ex. 1-1 to 1-7).

TABLE 1

| | | | | Blend | | |
|---|---|---|---|---|---|---|
| | Copolymer A | Copolymer B | A/B | Q value [$mm^3$/sec] | Content of carbonyl groups [Number] | Load W [N] |
| 1-1 | A-1 | B-1 | 99.7/0.3 | 28.5 | 2050 | 189 |
| 1-2 | A-1 | B-1 | 97/3 | 20.0 | 1950 | 211 |
| 1-3 | A-1 | B-1 | 94/6 | 13.7 | 1910 | 245 |
| 1-4 | A-1 | B-1 | 90/10 | 8.8 | 1830 | 326 |
| 1-5 | A-1 | B-1 | 85/15 | 4.5 | 1650 | 336 |
| 1-6 | A-1 | B-1 | 80/20 | 1.2 | 1530 | 345 |
| 1-7 | A-1 | B-1 | 70/30 | No flow | 1300 | 415 |

| | Copolymer | A/B | Q value | Content of carbonyl groups | Load W |
|---|---|---|---|---|---|
| Ref. Ex. 1 | Copolymer C-1 | — | 2.5 | 1950 | 314 |

| | Blend | | | | | |
|---|---|---|---|---|---|---|
| | Withdrawal strength | | | | | |
| | Maximum [mN] | Minimum [mN] | Average (melt transition X) [mN] | X/W [N/N] | Uniformity of strand diameter | MIT flex number [Number] | Adhesive strength [N/cm] |
| 1-1 | 6 | 5 | 6 | $3.0 \times 10^{-5}$ | x | 52000 | 21 |
| 1-2 | 12 | 11 | 12 | $5.5 \times 10^{-5}$ | ◯ | 47000 | 24 |
| 1-3 | 15 | 14 | 15 | $6.0 \times 10^{-5}$ | ◯ | 42000 | 22 |
| 1-4 | 24 | 23 | 23 | $7.2 \times 10^{-6}$ | ◯ | 27000 | 26 |
| 1-5 | 27 | 25 | 26 | $7.7 \times 10^{-5}$ | ◯ | 17000 | 23 |

TABLE 1-continued

| | | | | | | | |
|---|---|---|---|---|---|---|---|
| 1-6 | 31 | 29 | 30 | $8.7 \times 10^{-5}$ | o | 12000 | 22 |
| 1-7 | 39 | 37 | 38 | $9.1 \times 10^{-5}$ | x | 3000 | Not measurable |

| | Withdrawal strength | | | | | | |
|---|---|---|---|---|---|---|---|
| | Maximum | Minimum | Average (melt transition X) | X/W | Uniformity of strand diameter | MIT flex number | Adhesive strength |
| Ref. Ex. 1 | 26 | 28 | 27 | $8.8 \times 10^{-5}$ | o | 800 | 22 |

TABLE 2

| | Blend | | | | | |
|---|---|---|---|---|---|---|
| | Copolymer A | Copolymer B | A/B | Q value [mm³/sec] | Content of carbonyl groups [Number] | Load W [N] |
| 2-1 | A-2 | B-2 | 99.7/0.3 | 33.0 | 2500 | 178 |
| 2-2 | A-2 | B-2 | 97/3 | 23.0 | 2400 | 206 |
| 2-3 | A-2 | B-2 | 94/6 | 19.0 | 2300 | 228 |
| 2-4 | A-2 | B-2 | 91/9 | 12.0 | 2230 | 265 |
| 2-5 | A-2 | B-2 | 85/15 | 7.3 | 2150 | 314 |
| 2-6 | A-2 | B-2 | 80/20 | 1.3 | 1950 | 343 |
| 2-7 | A-2 | B-2 | 70/30 | No flow | 1700 | — |
| 3-1 | A-3 | B-3 | 99.7/0.3 | 25.0 | 3100 | 314 |
| 3-2 | A-3 | B-3 | 97/3 | 20.0 | 2900 | 334 |
| 3-3 | A-3 | B-3 | 94/6 | 16.3 | 2850 | 353 |
| 3-4 | A-3 | B-3 | 91/9 | 12.1 | 2700 | 392 |
| 3-5 | A-3 | B-3 | 85/15 | 7.3 | 2550 | 451 |
| 3-6 | A-3 | B-3 | 80/20 | 2.0 | 2200 | 520 |
| 3-7 | A-3 | B-3 | 70/30 | No flow | 2100 | — |
| 4-1 | A-4 | B-4 | 99.7/0.3 | 36.0 | 3200 | 265 |
| 4-2 | A-4 | B-4 | 97/3 | 31.0 | 2850 | 284 |
| 4-3 | A-4 | B-4 | 94/6 | 22.0 | 2800 | 304 |
| 4-4 | A-4 | B-4 | 91/9 | 15.0 | 2600 | 334 |
| 4-5 | A-4 | B-4 | 85/15 | 6.0 | 2500 | 363 |
| 4-6 | A-4 | B-4 | 80/20 | 1.0 | 2200 | 422 |
| 4-7 | A-4 | B-4 | 70/30 | No flow | 2100 | — |

| | Blend | | | | | | |
|---|---|---|---|---|---|---|---|
| | Withdrawal strength | | | | | | |
| | Maximum [mN] | Minimum [mN] | Average (melt transition X) [mN] | X/W [N/N] | Uniformity of strand diameter | MIT flex number [Number] | Adhesive strength [N/cm] |
| 2-1 | 3 | 5 | 4 | $2.3 \times 10^{-5}$ | x | 31000 | 14 |
| 2-2 | 12 | 8 | 10 | $4.8 \times 10^{-5}$ | o | 28000 | 13 |
| 2-3 | 13 | 10 | 12 | $5.4 \times 10^{-5}$ | o | 24000 | 15 |
| 2-4 | 20 | 15 | 18 | $6.7 \times 10^{-5}$ | o | 22000 | 13 |
| 2-5 | 29 | 22 | 25 | $8.1 \times 10^{-5}$ | o | 13000 | 13 |
| 2-6 | 35 | 30 | 33 | $9.5 \times 10^{-5}$ | o | 10000 | 11 |
| 2-7 | — | — | — | — | x | 900 | Not measurable |
| 3-1 | 10 | 8 | 9 | $2.9 \times 10^{-5}$ | o | 18000 | 23 |
| 3-2 | 16 | 13 | 15 | $4.6 \times 10^{-5}$ | o | 17000 | 22 |
| 3-3 | 20 | 16 | 18 | $5.1 \times 10^{-5}$ | o | 15000 | 24 |
| 3-4 | 29 | 23 | 25 | $6.4 \times 10^{-5}$ | o | 13000 | 22 |
| 3-5 | 44 | 37 | 41 | $9.1 \times 10^{-5}$ | o | 9000 | 22 |
| 3-6 | 58 | 47 | 52 | $1.0 \times 10^{-4}$ | o | 7500 | 21 |
| 3-7 | — | — | — | — | x | 2500 | Not measurable |
| 4-1 | 5 | 7 | 6 | $2.1 \times 10^{-5}$ | o | 7200 | 23 |
| 4-2 | 13 | 8 | 11 | $3.9 \times 10^{-5}$ | o | 6200 | 23 |
| 4-3 | 17 | 12 | 15 | $4.8 \times 10^{-5}$ | o | 5000 | 24 |
| 4-4 | 22 | 18 | 20 | $5.9 \times 10^{-5}$ | o | 3900 | 21 |
| 4-5 | 33 | 28 | 30 | $8.3 \times 10^{-5}$ | o | 2500 | 23 |
| 4-6 | 41 | 36 | 38 | $9.1 \times 10^{-5}$ | o | 2000 | 22 |
| 4-7 | — | — | — | — | x | 900 | Not measurable |

As shown in the above results, in the blends in Ex. 1-2 to 1-6, X/W was from $0.35\times10^{-4}$ to $2.0\times10^{-4}$, the uniformity of strand diameter was high, and the elongation deformability was excellent. Further, the adhesive strength was large, and adhesion was excellent. Further, the Q value was from 0.5 to 100 mm³/sec., and thus, the melt-moldability was good. Further, the MIT flex number was at least 10,000 times, and thus, the mechanical properties were also good.

On the other hand, in the blend in Ex. 1-1 wherein A/B was 99.7/0.3, X/W was small, the uniformity of strand diameter was low, and the elongation deformability was poor.

The blend in Ex. 1-7 wherein A/B was 70/30, showed no melt flowability. Therefore, it was not possible to measure the adhesive strength, and X/W was high, but the uniformity of strand diameter was low. Further, the MIT flex number was small, and thus, the mechanical properties were poor.

Also in Ex. 2-1 to 2-7, Ex. 3-1 to 3-7, and Ex. 4-1 to 4-7, wherein the types of monomers were changed, the same tendency as in Ex. 1-1 to 1-7 was observed.

Copolymer C-1 in Reference Example 1 had both carbonyl groups and units (c), whereby the Q value was from 0.5 to 100 mm³/sec. Copolymer C-1 had good results with respect to the uniformity of strand diameter and the adhesive strength, but the mechanical properties were poor. Therefore, it has been confirmed that blending Copolymer (A) and Copolymer (B) is effective in improving the mechanical properties.

The invention claimed is:

1. A fluorinated resin composition comprising:
    a copolymer (A); and
    a copolymer (B),
wherein:
    a mass ratio (AB) of the copolymer (A) to the copolymer (B) is from 60/40 to 99/1, and a volume flow rate is from 0.5 to 100 mm³/sec,
    the copolymer (A) comprises:
        units derived from a monomer (a) which is tetrafluoroethylene;
        units derived from a monomer (b) which is at least one member selected from ethylene, hexafluoropropylene and a perfluoro(alkyl vinyl ether);
        units derived from the monomer (d) having a carbonyl group and one polymerizable carbon-carbon double bond; and
        optionally units derived from a monomer (c) having two or more polymerizable carbon-carbon double bonds, wherein a content of the units derived from the monomer (c) is from 0 to 0.05 mol % based on total units in the copolymer (A), and the copolymer (A) has carbonyl groups,
    the copolymer (B) comprises:
        units derived from the monomer (a);
        units derived from the monomer (b); and
        units derived from the monomer (c), wherein a content of the units derived from the monomer (c) is from 0.1 to 2 mol % based on total units in the copolymer (B), and
    the volume flow rate is an extrusion rate (mm³/sec) when the fluorinated resin composition is extruded from an orifice having a diameter of 2.1 mm and a length of 8 mm under a pressure of 68.7 N/cm² at a temperature of the melting point+50° C. of the fluorinated resin composition.

2. The fluorinated resin composition according to claim 1, wherein the monomer (d) is an acid anhydride of an unsaturated dicarboxylic acid.

3. The fluorinated resin composition according to claim 1, wherein a content of carbonyl groups in a total of the copolymer (A) and the copolymer (B) is from 1,400 to 5,000, wherein the content of carbonyl groups is the number of carbonyl groups per $1\times10^6$ carbon atoms in a molecular chain of repeating units in the total of the copolymer (A) and the copolymer (B), as determined by an IR absorption spectrum analysis using a Fourier transform infrared spectrometer.

4. The fluorinated resin composition according to claim 1, wherein a ratio (X/W) of a melt tension X (N) to a load W (N) at the time of measuring the melt tension X is from $0.35\times10^{-4}$ to $2.0\times10^{-4}$.

5. The fluorinated resin composition according to claim 1, wherein the monomer (c) is represented by formula (c1):

$$Y^1—R^f—Z^1 \qquad (c1)$$

wherein $R^f$ is a fluoroalkylene group, and $Y^1$ and $Z^1$ are each independently a vinyl group, a trifluorovinyl group or a trifluorovinyloxy group.

6. The fluorinated resin composition according to claim 5, wherein $R^f$ is a perfluoroalkylene group having from 4 to 8 carbon atoms.

7. The fluorinated resin composition according to claim 1, wherein the units derived from the monomer (b) in the copolymer (A) and the units derived from the monomer (b) in the copolymer (B) are both units derived from ethylene.

8. The fluorinated resin composition according to claim 7, wherein a molar ratio ([units derived from monomer (a)]/[units derived from monomer (b)]) of the units derived from the monomer (a) to the units derived from the monomer (b) in each of the copolymer (A) and the copolymer (B) is from 30/70 to 70/30.

9. The fluorinated resin composition according to claim 7, wherein each of the copolymer (A) and the copolymer (B) further comprises units derived from hexafluoropropylene, wherein a content of the units derived from hexafluoropropylene in the copolymer (A) is from 4 to 19 mol % based on the total units in the copolymer (A) and a content of the units derived from hexafluoropropylene in the copolymer (B) is from 4 to 19 mol % based on the total units in the copolymer (B).

10. The fluorinated resin composition according to claim 1, wherein the units derived from the monomer (b) in the copolymer (A) and the units derived from the monomer (b) in the copolymer (B), are both units derived from hexafluoropropyl ene.

11. The fluorinated resin composition according to claim 10, wherein a molar ratio ([units derived from monomer (a)]/[units derived from monomer (b)]) of the units derived from the monomer (a) to the units derived from the monomer (b) in each of the copolymer (A) and the copolymer (B) is from 60/40 to 97/3.

12. The fluorinated resin composition according to claim 1, wherein the units derived from the monomer (b) in the copolymer (A) and the units derived from the monomer (b) in the copolymer (B) are both units derived from a perfluoro (alkyl vinyl ether).

13. The fluorinated resin composition according to claim 12, wherein a molar ratio ([units derived from monomer (a)]/[units derived from monomer (b)]) of the units derived from the monomer (a) to the units derived from the monomer (b) in each of the copolymer (A) and the copolymer (B) is from 70/30 to 99/1.

14. The fluorinated resin composition according to claim 1, wherein a melting point of the copolymer (A) is from 120 to 230° C.

15. A fluorinated resin composition comprising:
a copolymer (A); and
a copolymer (B),
wherein:
a mass ratio (A/B) of the copolymer (A) to the copolymer (B) is from 60/40 to 99/1, and a volume flow rate is from 0.5 to 100 mm$^3$/sec,
the copolymer (A) comprises:
units derived from a monomer (a) which is tetrafluoroethylene;
units derived from a monomer (b) which is at least one member selected from ethylene, hexafluoropropylene and a perfluoro(alkyl vinyl ether); and
optionally units derived from a monomer (c) having two or more polymerizable carbon-carbon double bonds, wherein a content of the units derived from the monomer (c) is from 0 to 0.05 mol % based on total units in the copolymer (A), and the copolymer (A) has carbonyl groups,
the copolymer (B) comprises:
units derived from the monomer (a);
units derived from the monomer (b); and
units derived from the monomer (c), wherein a content of the units derived from the monomer (c) is from 0.1 to 2 mol % based on total units in the copolymer (B),
the volume flow rate is an extrusion rate (mm$^3$/sec) when the fluorinated resin composition is extruded from an orifice having a diameter of 2.1 mm and a length of 8 mm under a pressure of 68.7 N/cm$^2$ at a temperature of the melting point+50° C. of the fluorinated resin composition, and
a content of carbonyl groups in a total of the copolymer (A) and the copolymer (B) is from 1,400 to 5,000, wherein the content of carbonyl groups is the number of carbonyl groups per 1×10$^6$ carbon atoms in a molecular chain of repeating units in the total of the copolymer (A) and the copolymer (B), as determined by an IR absorption spectrum analysis using a Fourier transform infrared spectrometer.

16. The fluorinated resin composition according to claim 15, wherein the monomer (d) is an acid anhydride of an unsaturated dicarboxylic acid.

17. The fluorinated resin composition according to claim 15, wherein a ratio (X/W) of a melt tension X (N) to a load W (N) at the time of measuring the melt tension X is from 0.35×10$^{-4}$ to 2.0×10$^{-4}$.

18. The fluorinated resin composition according to claim 15, wherein the monomer (c) is represented by formula (c1):

$$Y^1—R^f—Z^1 \quad (c1)$$

wherein R$^f$ is a fluoroalkylene group, and Y$^1$ and Z$^1$ are each independently a vinyl group, a trifluorovinyl group or a trifluorovinyloxy group.

19. The fluorinated resin composition according to claim 18, wherein R$^f$ is a perfluoroalkylene group having from 4 to 8 carbon atoms.

20. The fluorinated resin composition according to claim 15, wherein the units derived from the monomer (b) in the copolymer (A) and the units derived from the monomer (b) in the copolymer (B) are both units derived from ethylene.

21. The fluorinated resin composition according to claim 20, wherein a molar ratio ([units derived from monomer (a)]/[units derived from monomer (b)]) of the units derived from the monomer (a) to the units derived from the monomer (b) in each of the copolymer (A) and the copolymer (B) is from 30/70 to 70/30.

22. The fluorinated resin composition according to claim 20, wherein each of the copolymer (A) and the copolymer (B) further comprises units derived from hexafluoropropylene, wherein a content of the units derived from hexafluoropropylene in the copolymer (A) is from 4 to 19 mol % based on the total units in the copolymer (A) and a content of the units derived from hexafluoropropylene in the copolymer (B) is from 4 to 19 mol % based on the total units in the copolymer (B).

23. The fluorinated resin composition according to claim 15, wherein the units derived from the monomer (b) in the copolymer (A) and the units derived from the monomer (b) in the copolymer (B), are both units derived from hexafluoropropylene.

24. The fluorinated resin composition according to claim 23, wherein a molar ratio ([units derived from monomer (a)]/[units derived from monomer (b)]) of the units derived from the monomer (a) to the units derived from the monomer (b) in each of the copolymer (A) and the copolymer (B) is from 60/40 to 97/3.

25. The fluorinated resin composition according to claim 15, wherein the units derived from the monomer (b) in the copolymer (A) and the units derived from the monomer (b) in the copolymer (B) are both units derived from a perfluoro (alkyl vinyl ether).

26. The fluorinated resin composition according to claim 25, wherein a molar ratio ([units derived from monomer (a)]/[units derived from monomer (b)]) of the units derived from the monomer (a) to the units derived from the monomer (b) in each of the copolymer (A) and the copolymer (B) is from 70/30 to 99/1.

27. The fluorinated resin composition according to claim 15, wherein a melting point of the copolymer (A) is from 120 to 230° C.

* * * * *